US008678471B2

(12) United States Patent
McCarthy et al.

(10) Patent No.: US 8,678,471 B2
(45) Date of Patent: Mar. 25, 2014

(54) IN-LINE JACK

(75) Inventors: Robert E. McCarthy, Crete, IL (US); John L. Verre, Orland Park, IL (US); Douglas A. Bakker, Cedar Lake, IN (US)

(73) Assignee: Rieco-Titan Products, Inc., Frankfort, IL (US)

( * ) Notice: Subject to any disclaimer, the term of this patent is extended or adjusted under 35 U.S.C. 154(b) by 12 days.

(21) Appl. No.: 13/281,062

(22) Filed: Oct. 25, 2011

(65) Prior Publication Data
US 2012/0037862 A1 Feb. 16, 2012

Related U.S. Application Data

(60) Continuation-in-part of application No. 12/331,111, filed on Dec. 9, 2008, now Pat. No. 8,480,158, which is a division of application No. 11/655,562, filed on Jan. 19, 2007, now Pat. No. 7,722,110.

(51) Int. Cl.
*B60P 1/00* (2006.01)
(52) U.S. Cl.
USPC .......................................... 296/156
(58) Field of Classification Search
USPC .......... 296/156, 164, 167; 254/103, 126, 425, 254/418, 45; 248/480; 280/477
See application file for complete search history.

(56) References Cited

U.S. PATENT DOCUMENTS

| 964,394 | A | | 7/1910 | Coddington | |
|---|---|---|---|---|---|
| 2,837,312 | A | * | 6/1958 | Troche | 254/423 |
| 3,022,043 | A | * | 2/1962 | Weiss | 254/98 |
| 3,197,054 | A | | 7/1965 | Settem | |
| 3,368,839 | A | | 2/1968 | Stewart | |
| 3,414,916 | A | * | 12/1968 | Martin et al. | 114/344 |
| 3,436,774 | A | | 4/1969 | Schmitz | |
| 3,507,476 | A | | 4/1970 | Bennett | |
| 3,523,698 | A | | 8/1970 | Bishop | |
| 3,580,599 | A | * | 5/1971 | Dodgen et al. | 280/638 |
| 3,595,527 | A | * | 7/1971 | Douglass | 254/420 |
| 3,640,502 | A | | 2/1972 | Bargman, Jr. | |
| 3,679,174 | A | | 7/1972 | Boettcher | |

(Continued)

FOREIGN PATENT DOCUMENTS

| CN | 2759988 | 2/2006 |
|---|---|---|
| CN | 201209102 | 3/2009 |
| DE | 195 08 089 A1 | 10/1995 |

*Primary Examiner* — Kiran B Patel
(74) *Attorney, Agent, or Firm* — Leydig, Voit & Mayer, Ltd.

(57) ABSTRACT

An in-line jack includes a body, an extendable shaft, drive mechanics, and a motor. The body has first and second distal ends. The extendable shaft is movably disposed within the body and has a distal end extending out of the second distal end of the body. The drive mechanics are disposed within the body and are adapted to move the extendable shaft with respect to the body. The motor is mounted at the first distal end of the body and is adapted to selectively drive the drive mechanics. A coupling mechanism can be provided to selectively alternately couple: (i) a planetary gear system associated with the motor to a drive shaft of a jack screw assembly and (ii) a manual crankshaft to the drive shaft to operate the jack manually. The body and the motor each has a generally cylindrical outer surface with an outer diameter equal to or less than about three inches. The body, the jack screw assembly, the coupling mechanism, the planetary gear system, and the motor are substantially axially aligned with each other.

13 Claims, 21 Drawing Sheets

(56) References Cited

U.S. PATENT DOCUMENTS

| | | | | |
|---|---|---|---|---|
| 3,689,029 A | * | 9/1972 | Bargman, Jr. | 254/45 |
| 3,709,467 A | * | 1/1973 | Mann | 254/45 |
| 3,758,074 A | | 9/1973 | Jeffries et al. | |
| 3,828,379 A | | 8/1974 | Walston | |
| 3,844,535 A | * | 10/1974 | Dorough, Jr. | 254/103 |
| 3,909,057 A | | 9/1975 | Guthry | |
| 3,984,082 A | | 10/1976 | Boettcher | |
| 4,044,999 A | * | 8/1977 | Dodgen | 254/45 |
| 4,176,824 A | | 12/1979 | Linton et al. | |
| 4,176,825 A | | 12/1979 | Schwebke | |
| 4,238,113 A | * | 12/1980 | Adams | 254/425 |
| 4,240,334 A | | 12/1980 | Crosser | |
| 4,247,145 A | | 1/1981 | Groene | |
| 4,254,927 A | | 3/1981 | Stonhaus | |
| 4,483,515 A | * | 11/1984 | Maryonovich | 254/103 |
| 4,685,695 A | | 8/1987 | LeVee | |
| 4,754,998 A | | 7/1988 | LeJuerrne | |
| 4,784,369 A | | 11/1988 | Bock | |
| 4,969,631 A | * | 11/1990 | Whittingham | 254/425 |
| 5,118,082 A | | 6/1992 | Byun | |
| 5,188,379 A | | 2/1993 | Krause et al. | |
| 5,219,429 A | | 6/1993 | Shelton | |
| 5,273,256 A | | 12/1993 | Chambers | |
| 5,312,119 A | | 5/1994 | Schneider et al. | |
| D348,966 S | | 7/1994 | Guyton | |
| 5,348,258 A | | 9/1994 | Rasmussen | |
| 5,542,647 A | * | 8/1996 | Huetsch | 254/420 |
| 5,553,825 A | * | 9/1996 | Rasmussen | 248/354.3 |
| 5,575,493 A | * | 11/1996 | Schwartz et al. | 280/475 |
| 5,680,732 A | | 10/1997 | Skouras | |
| 5,711,561 A | | 1/1998 | Boysen | |
| 5,755,430 A | | 5/1998 | Couch | |
| 5,848,870 A | | 12/1998 | Smith et al. | |
| 5,934,738 A | | 8/1999 | Welles | |
| 5,984,353 A | * | 11/1999 | Rasmussen | 280/766.1 |
| 6,071,062 A | * | 6/2000 | Warhurst et al. | 414/498 |
| 6,102,468 A | | 8/2000 | Lowrey et al. | |
| 6,135,525 A | * | 10/2000 | Amann | 296/26.11 |
| 6,142,501 A | | 11/2000 | Fogo et al. | |
| 6,170,502 B1 | | 1/2001 | Pullen | |
| 6,250,650 B1 | | 6/2001 | Douglas | |
| 6,267,357 B1 | | 7/2001 | Ebey et al. | |
| 6,283,536 B1 | | 9/2001 | Muzyka et al. | |
| 6,517,026 B1 | | 2/2003 | Smith | |
| 6,679,542 B1 | | 1/2004 | Semotuk | |
| 6,698,810 B1 | | 3/2004 | Lane | |
| 6,712,414 B2 | | 3/2004 | Morrow | |
| 6,789,361 B1 | | 9/2004 | Spartz et al. | |
| 6,893,006 B2 | * | 5/2005 | Drake, III | 254/425 |
| 6,895,648 B1 | | 5/2005 | Willett | |
| 6,926,305 B2 | * | 8/2005 | Daniel | 280/766.1 |
| 7,014,238 B2 | | 3/2006 | Gonzalez | |
| 7,044,445 B1 | | 5/2006 | Crawford | |
| 7,198,314 B1 | | 4/2007 | Edwards | |
| 7,287,798 B2 | | 10/2007 | King | |
| 7,311,294 B1 | | 12/2007 | Ruan | |
| 7,325,786 B2 | * | 2/2008 | Drake, III | 254/419 |
| 2001/0052592 A1 | | 12/2001 | Alvarado | |
| 2006/0284146 A1 | | 12/2006 | Perham | |
| 2007/0152203 A1 | * | 7/2007 | Green | 254/420 |
| 2008/0054598 A1 | * | 3/2008 | Weber et al. | 280/414.1 |
| 2008/0174146 A1 | | 7/2008 | McCarthy et al. | |
| 2009/0057633 A1 | * | 3/2009 | Beck et al. | 254/420 |
| 2012/0247159 A1 | * | 10/2012 | Shelton | 70/58 |

* cited by examiner

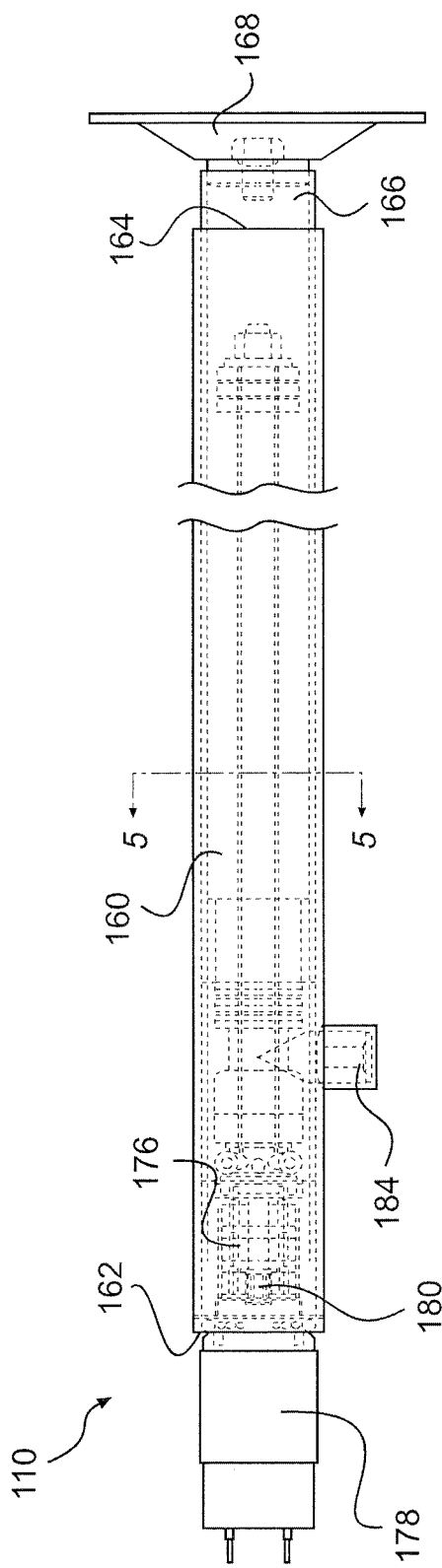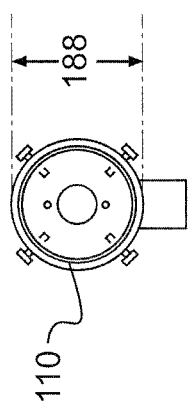
FIG. 4
FIG. 5

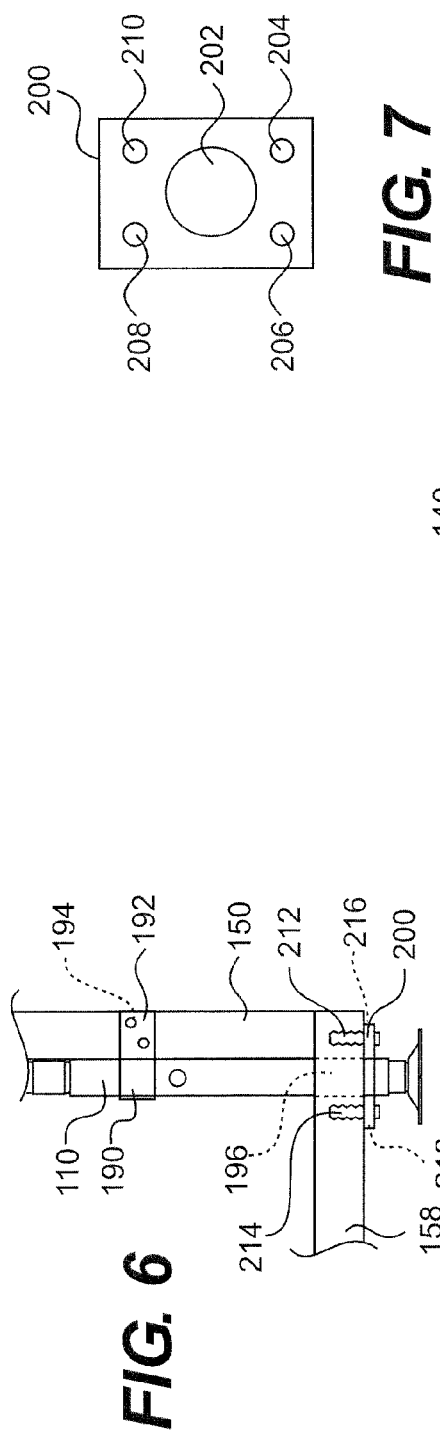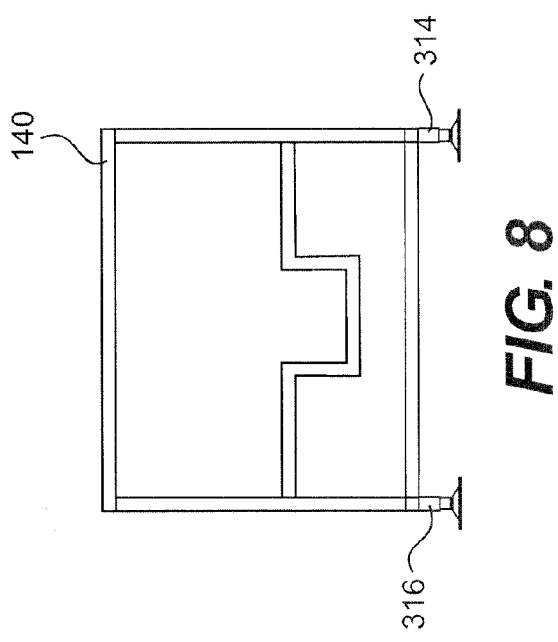

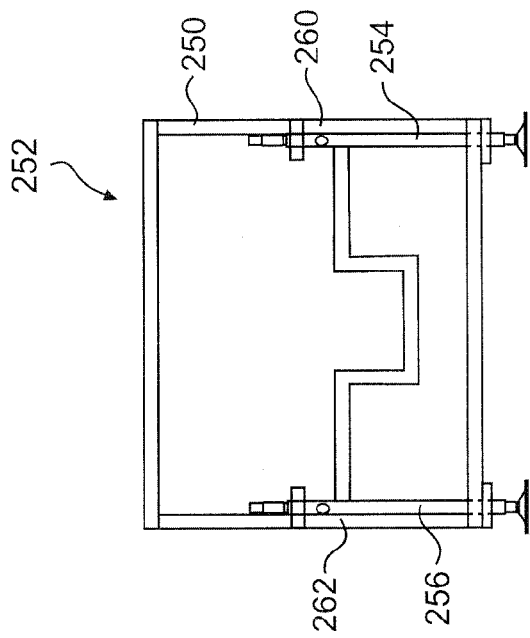
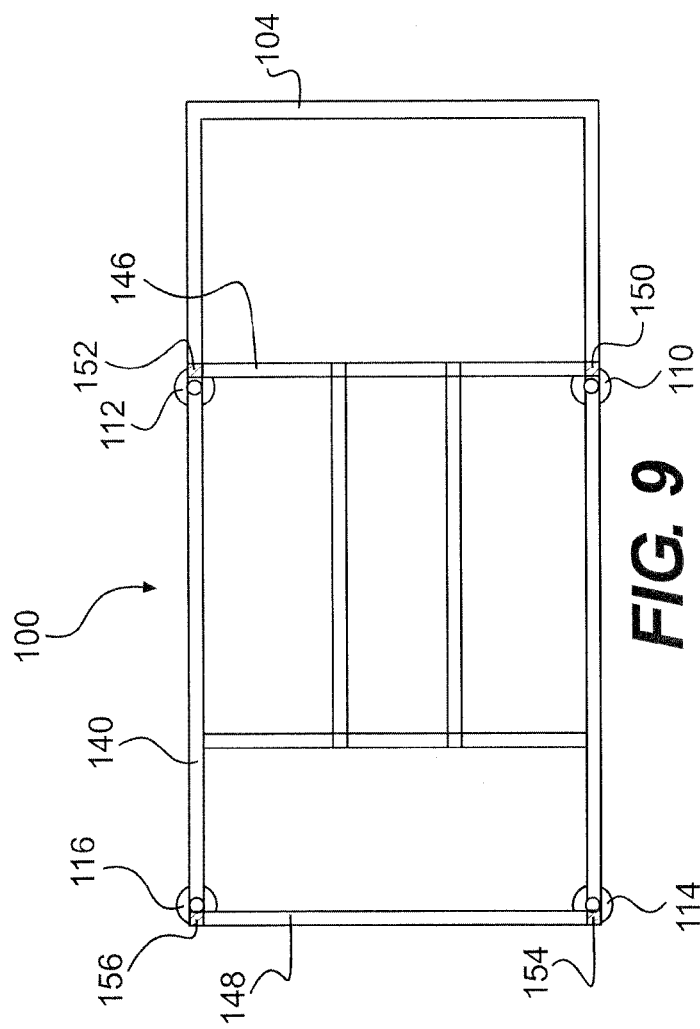

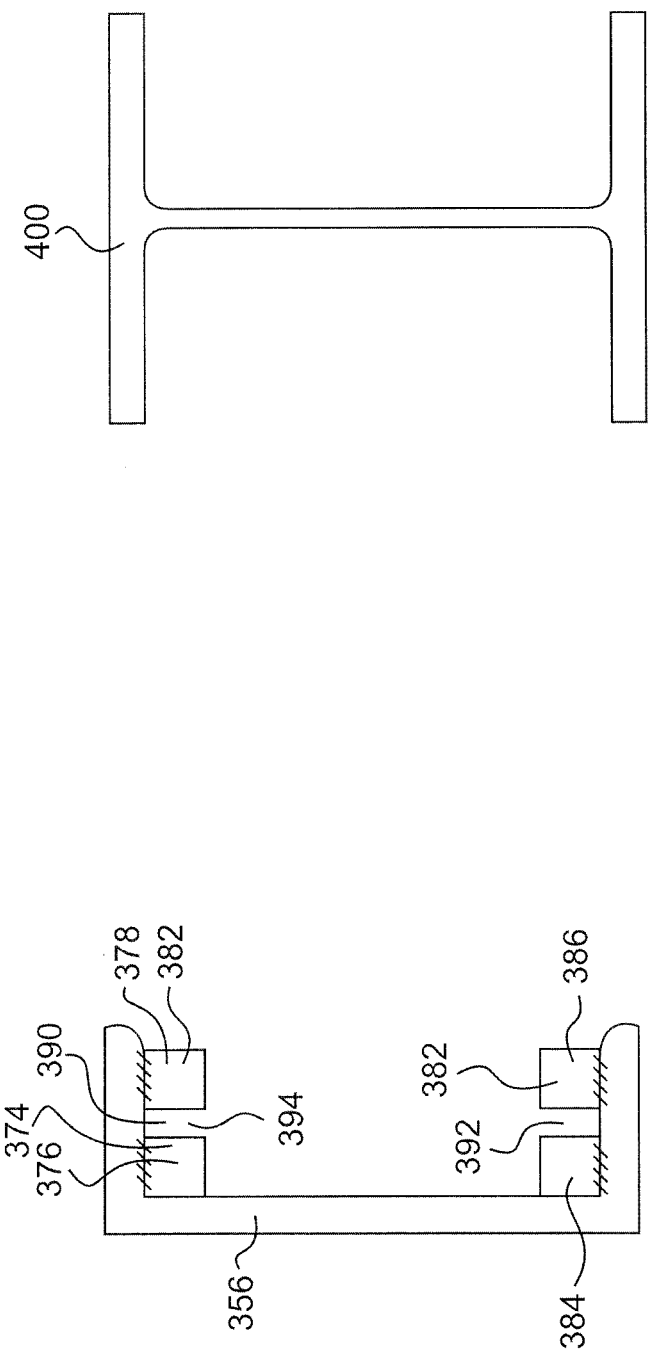

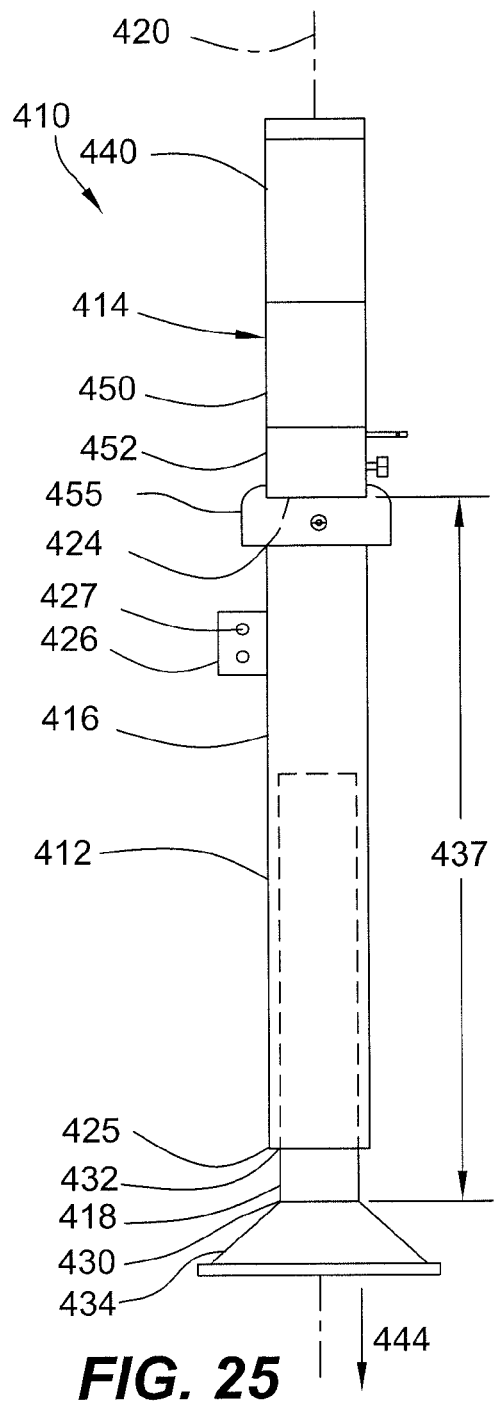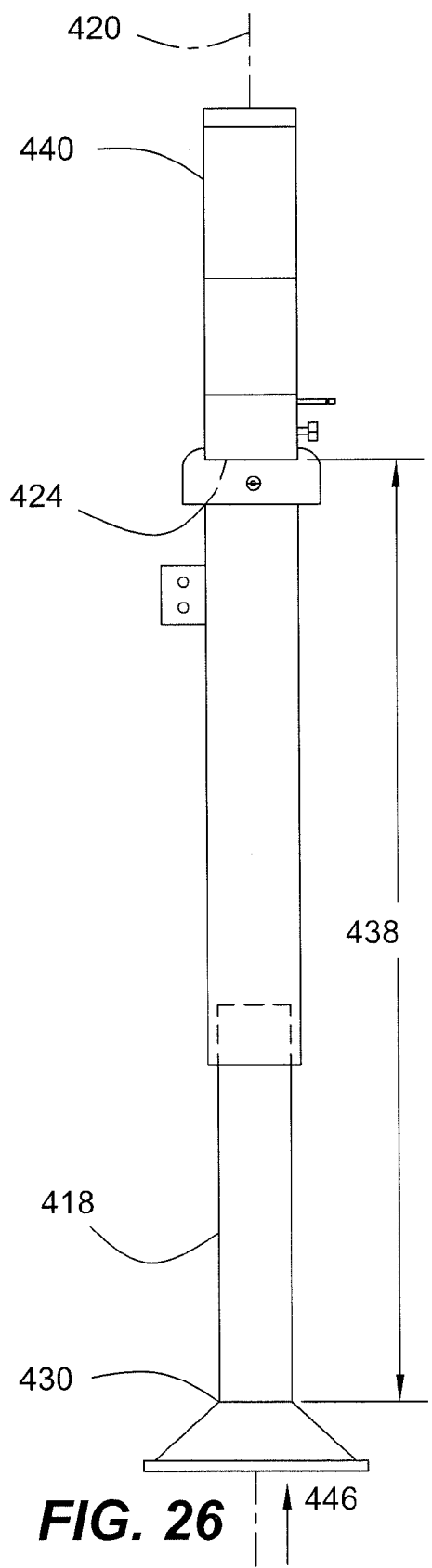
FIG. 25
FIG. 26

IN-LINE JACK

CROSS-REFERENCE TO RELATED APPLICATIONS

This patent application is a continuation-in-part of co-pending U.S. patent application Ser. No. 12/331,111, filed Dec. 9, 2008, which is a divisional of U.S. patent application Ser. No. 11/655,562, filed Jan. 19, 2007, issued as U.S. Pat. No. 7,722,110, which are incorporated in their entireties herein by this reference.

TECHNOLOGICAL FIELD

The present application relates generally to a jack, and more particularly to an in-line jack for a vehicle or towing device, for example.

BACKGROUND

Tubular jacks have been used for many years, such as for use on trailers or pick-up truck campers, which have no wheels and must be lifted on and off a truck for transport to a campsite. Typical pick-up truck campers that rely on jacks to raise and lower the camper have included external jacks mounted to the outside of the camper. The external jacks project from the outside walls of the camper. Such an arrangement can be unsightly. Additionally, because the external jacks are mounted outside of the camper, they are more susceptible to damage from impact with other objects during normal use of the camper. The external jacks are also susceptible to damage from the elements such as, for, example rusting. External jacks have been attached to the campers by a variety of attachment means. The external jacks can also be removable and may only be attached to the campers when needed. This arrangement presents an inconvenience to the user of the camper as attaching and removing the external jacks is time consuming and laborious.

Furthermore, typical tubular jacks have crank mechanisms (either manual or powered) that extend radially outwardly from the tube of the jack during use. Accordingly, additional clearance space must be provided when locating such a tubular jack in order to allow it to be operated to extend and retract the jack.

SUMMARY

The present disclosure provides, in one aspect, a jack including a body, an extendable shaft, drive mechanics adapted to move the extendable shaft with respect to the body, and a motor adapted to selectively drive the drive mechanics. The body has first and second distal ends. The extendable shaft is movably disposed within the body and has a distal end extending out of the second distal end of the body. The drive mechanics are disposed within the body and are adapted to move the extendable shaft with respect to the body. The drive mechanics include a planetary gear system. The motor is mounted at the first distal end of the body and is adapted to selectively drive the drive mechanics. The body and the motor each has a generally cylindrical outer surface with an outer diameter equal to or less than about three inches. The body, the planetary gear system, and the motor are substantially axially aligned with each other.

In another aspect of the present disclosure, an in-line jack includes a tubular body with first and second ends, an extendable shaft disposed within the body, and a drive assembly mounted to the first end of the body. The tubular body extends along a longitudinal axis. The shaft is reciprocally movable along the longitudinal axis relative to the body. The drive assembly extends substantially along the longitudinal axis. The drive assembly is adapted to selectively move the shaft with respect to the body over a range of travel between a retracted position, in which a distal end of the shaft is disposed a first distance from the first end of the body along the longitudinal axis, and an extended position, in which the distal end of the shaft is disposed a second distance from the first end of the body along the longitudinal axis. The second distance is greater than the first distance.

The drive assembly includes a jack screw assembly, a drive shaft, a planetary gear system, and a motor. The jack screw assembly is attached to both the tubular body and the shaft and is adapted to selectively move the shaft relative to the body along the longitudinal axis in a retracting direction so that the shaft moves toward the retracted position and an extending direction so that the shaft moves toward the extended position. The drive shaft is operably arranged with the jack screw assembly to move the jackscrew assembly. The planetary gear system is adapted to rotate the drive shaft. The motor is operably arranged with the planetary gear system and is adapted to selectively drive the planetary gear system to rotate the drive shaft. The motor, the planetary gear system, and the drive shaft are adapted to selectively move the jack screw assembly such that the extendable shaft is selectively movable with respect to the tubular body in the extending direction and the retracting direction. The jack screw assembly, the drive shaft, the planetary gear system, and the motor are concentrically arranged about the longitudinal axis.

In still another aspect of the present disclosure, an in-line jack includes a jack post and an in-line drive assembly. The jack post includes a tubular body and an extendable shaft. The body includes first and second ends defining respective openings in communication with an interior cavity. The shaft is movably disposed within the interior cavity of the body and has a distal end extending out of the opening at the second end of the body.

The in-line drive assembly includes a jackscrew assembly, a drive shaft operably arranged with the jackscrew assembly, and a planetary gear and motor assembly operably arranged with the drive shaft. The jackscrew assembly is mounted to the body and the shaft of the jack post and is adapted to move the shaft relative to the body over a range of travel between a retracted position and an extended position. The jackscrew assembly includes a threaded screw defining a longitudinal axis. The drive shaft is operably arranged with the jackscrew assembly to turn the screw in a first direction to move the shaft relative to the body in an extending direction along the longitudinal axis toward the extended position and in a second direction, opposing the first direction, to move the shaft relative to the body in a retracting direction along the longitudinal axis toward the retracted position. The planetary gear and motor assembly is mounted to the body and is operably arranged with the drive shaft to selectively turn the screw in the first direction and the second direction. The planetary gear and motor assembly is substantially axially aligned with the body and substantially parallel to the longitudinal axis of the threaded screw.

BRIEF DESCRIPTION OF THE SEVERAL VIEWS OF THE DRAWINGS

FIG. 4 is an elevational view of a jack of the camper of FIG. 1 constructed in accordance with principles of the present disclosure.

FIG. 5 is a sectional view of the jack of FIG. 4 taken along line 5-5.

FIG. 6 is a fragmentary view of the frame of the pick-up truck camper of FIG. 1.

FIG. 7 is a top view of a mounting plate of the camper of FIG. 1.

FIG. 8 is a rear elevational view of the frame of the pick-up truck camper of FIG. 1.

FIG. 9 is a top plan view of the frame of the pick-up truck camper of FIG. 1.

FIG. 10 is a rear elevational view of a frame and a plurality of jacks constructed in accordance with principles of the present disclosure of another embodiment of a camper.

FIG. 21 is a side view of a channeled member of the camper of FIG. 11.

FIG. 22 is a side view of an I-beam of the camper of FIG. 11.

FIG. 25 is a side elevational view of another embodiment of an in-line jack constructed in accordance with principles of the present disclosure.

FIG. 26 is a side elevational view of the in-line jack as in FIG. 25, but with an extendable shaft of a jack post of the in-line jack in an extended position.

DETAILED DESCRIPTION OF VARIOUS EMBODIMENTS

Figure 1:
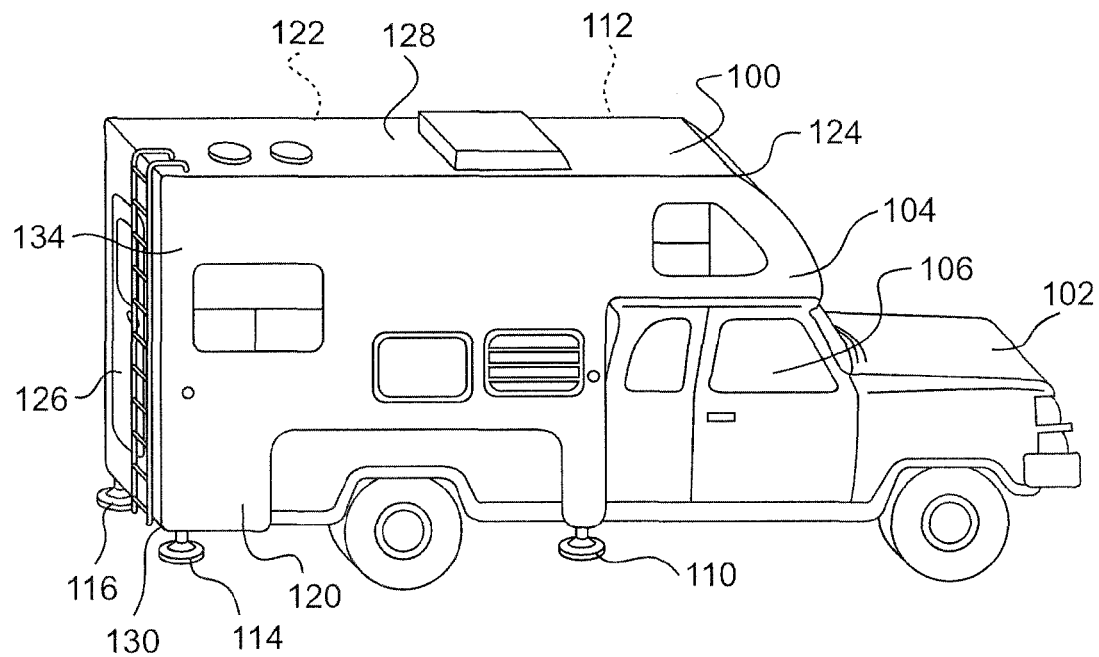
FIG. 1 is a perspective view of an embodiment of a pick-up truck camper.

Referring to FIG. 1, an embodiment of a pick-up truck camper 100 can be configured to mount onto a vehicle 102 such as, for example, a pick-up truck. The camper 100 may rest in the flat bed of the truck 102 and include an overhang 104 that extends over the cabin 106 of the truck 102. The camper 100 may include a first jack 110, a second jack 112, a third jack 114, and a fourth jack 116. The jacks 110, 112, 114, 116 may be used to raise the camper 100 off of the truck 102 so that the truck 102 may drive out from underneath the camper 100. The jacks 110, 112, 114, 116 may also be used to lower the camper 100 onto the truck 102, when the truck 102 is positioned below the camper 100. Once the camper 100 is properly mounted on the truck 102, the jacks 110, 112, 114, 116 may be retracted so that the truck 102 may maneuver with the camper 100 securely mounted on the truck 102, as shown in FIG. 1.

Figure 2:
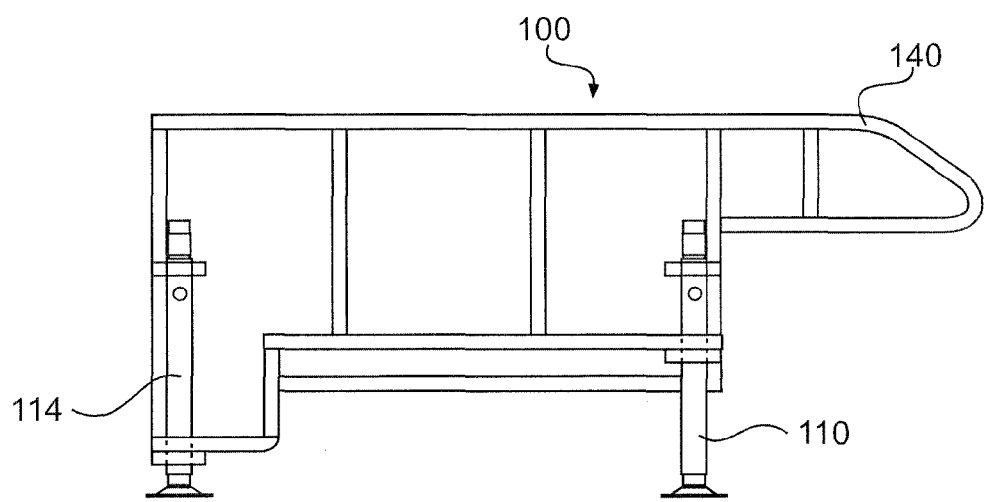
FIG. 2 is a side elevational view of a frame and a plurality of jacks constructed in accordance with principles of the present disclosure of the camper of FIG. 1.

Referring to FIG. 1, the pick-up truck camper 100 further comprises a first sidewall 120, a second sidewall 122, a front wall 124, and a rear wall 126 covering a frame 140 (see FIG. 2). The camper 100 may also include a top wall 128 and a bottom wall 130. The walls 120, 122, 124, 126, 128, 130 define the exterior 134 of the camper 100. Referring to FIG. 2, the walls can be mounted to the frame 140 of the camper 100. The frame 140 can be located inside the exterior of the camper 100.

Figure 3:
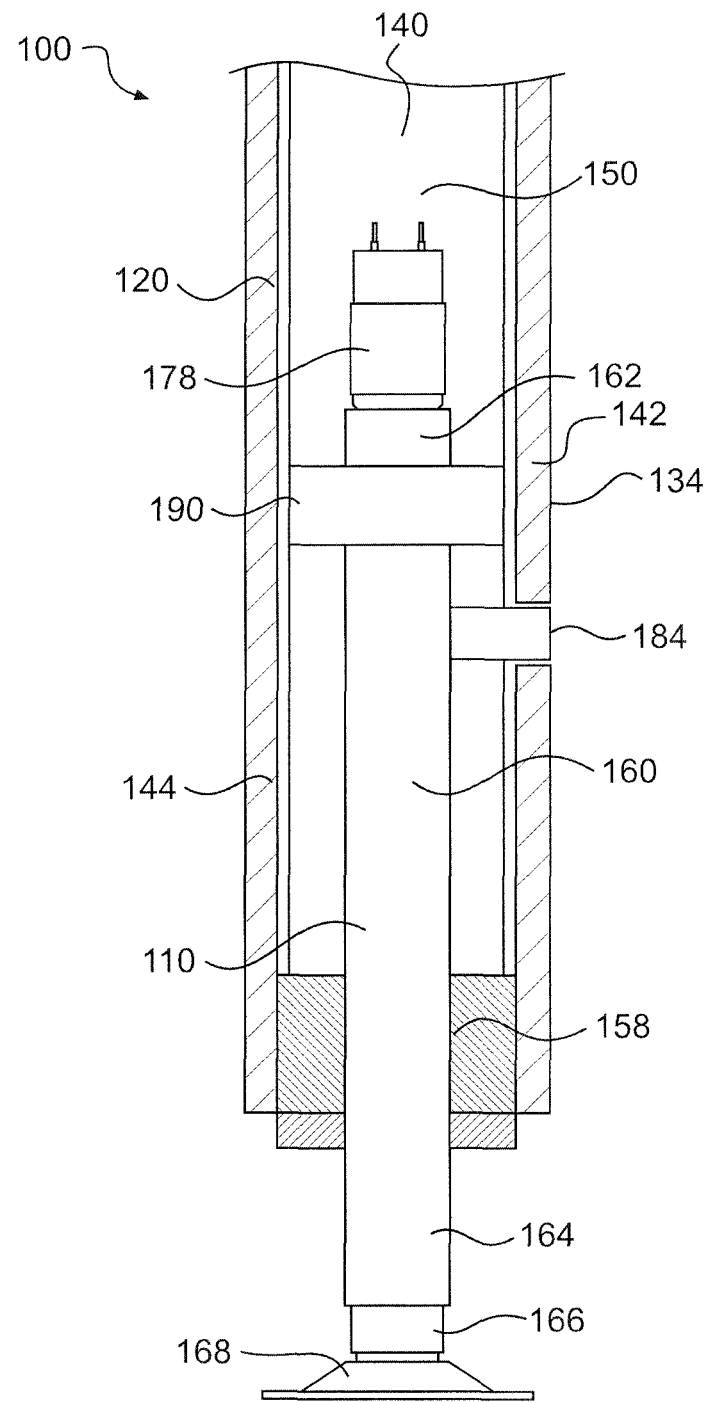
FIG. 3 is a cross-sectional view of a sidewall of the camper of FIG. 1.

Referring to FIG. 3, the first sidewall 120 may have a double-walled construction and may be comprised of an outer wall 142, which constitutes the exterior 134 of the camper 100, and an inner wall 144. The outer wall 142 and the inner wall 144 may be substantially planar to each other. The frame 140 may also be disposed between the outer wall 142 and the inner wall 142 of the first sidewall 120. The second sidewall, the front wall, the rear wall, the top wall, and the bottom wall may be similarly constructed as the first sidewall 120. Accordingly, the second sidewall, the front wall, the rear wall, the top wall, and the bottom wall may also all have a double wall construction including an inner wall and outer wall. The frame may be disposed between the inner walls and the outer walls of all the camper walls.

Referring to FIG. 1, the first jack 110 may be disposed inside the first sidewall 120. The second jack 112 may be disposed inside the second sidewall 122. The third jack 114 and the fourth jack 116 may be disposed inside the first and second sidewalls 120, 122, respectively. The sidewalls 120, 122 may be substantially planar such that the internal and external walls of the sidewalls 120, 122 do not bulge in order to accommodate the jacks 110, 112, 114, 116. In other embodiments, the internal walls of the sidewalls 120, 122 can include a bulged area or an unevenness to accommodate one or more of the jacks 110, 112, 114, 116. In embodiments where the sidewalls 120, 122 do not have a double-walled construction, the jacks 110, 112, 114, 116 can be completely or partially exposed such that they are visible from the interior of the camper.

Referring to FIG. 9, the first and second jacks 110, 112 may be disposed at the front 146 of the camper 100 and the third and fourth jacks 114, 116 may be disposed at the rear 148 of the camper 100. The frame 100 may include a first corner post 150, a second corner post 152, a third corner post 154, and a fourth corner post 156. The first, second, third, and fourth jacks 110, 112, 114, 116 may be mounted to the first, second, third, and fourth corner posts 150, 152, 154, 156, respectively.

The first, second, third, and fourth jacks 110, 112, 114, 116 may all be similarly configured and similarly mounted to the camper 100. Accordingly, only the first jack 110 will be described in detail. Referring to FIG. 2, the first jack 110 may be mounted to the frame 140 at the first corner post 150. Referring to FIG. 3, the first corner post 150 and a first lower bar 158 of the frame 140 may be disposed between the inner wall 144 and the outer wall 142 of the first sidewall 120. The jack 110 can be hidden from view except for those portions extending below the first sidewall 120.

Referring to FIG. 3, the jack 110 may have a tubular body 160 with first and second distal ends 162, 164. The jack 110 may include an extendable shaft 166 disposed within the body 160 and extending out of the second distal end 164 of the body 160. A foot 168 may be located at a lower distal end 170 of the shaft 166. Referring to FIG. 4, the jack 110 may include drive mechanics 176 internal to the body 160. The internal mechanics 176 operate to extend and retract the extendable shaft 164 out of and into the body 160. The jack 110 may include an electric motor 178 mounted at the first distal end 162 of the body 160 wherein the electric motor 178 drives the mechanics 176. The mechanics 176 may include gearing such as, for example, planetary gears, that translate the rotary motion of the motor's drive shaft 180 into linear motion of the extendable shaft 164. The operator can operate the jack 110 from inside and/or outside the camper.

The mechanics 176 of the jack 110 may also be driven manually by a crankshaft. The jack 110 includes a crankshaft port 184 for receiving the operating end of a crankshaft. Referring to FIG. 3, the crankshaft port 184 may extend through the outer wall 142 of the first sidewall 120 so that an operator may operate the jack 110 from outside the camper with a crankshaft. The jack 110 can be adapted such that the operator can operate the jack 110 with a crankshaft from either inside or outside the camper.

Referring to FIG. 4, the jack has a diameter 188 that is sufficiently small so that the jack 110 may be disposed within the first sidewall 120. The jack 110 may have a diameter 188 of 2.25 inches (6.67 cm). In another embodiment, the jack may have a diameter 188 of between 1.75 inches (4.45 cm) and 3.00 inches (7.62 cm).

Referring to FIG. 6, the first jack 110 may be attached to the corner post 150 by a strap 190 with a first end 192 and a second end 194. The strap 190 may wrap around the jack 110 while the first end 192 and the second end 194 may be bolted to the corner post 150, thereby securing the jack 110 to the corner post 150. The strap 190 may mount the first jack 110 to the corner post 150 by tightly surrounding the jack 110. The strap 190 may be a two inch wide band of 16 gauge steel. The first jack 110 may also be mounted to the frame 140 at a lower bar 158 of the frame 140. The lower bar 158 may have a hole 196 that passes therethrough. The jack 110 may pass through the hole 196 in the bar 158. The jack 110 may include a mounting plate 200 welded to the jack 110 below the lower bar 158. The mounting plate 200 may be bolted to the underside of the lower bar 158, thereby securing the jack 110 to the lower bar 158. Referring to FIG. 7, the mounting plate 200 may include a center hole 202 through which the jack passes. The mounting plate 200 may further include four bolt holes 202, 204, 206, and 208 that pass therethrough. Referring to FIG. 6, the bolt holes may receive bolts 212, 214, 216, 218 to secure the jack 110 to the underside of the lower bar 158.

Referring to FIG. 10, there is shown the frame 250 of another embodiment of a pick-up truck camper 252. The third jack 254 and the fourth jack 256 are disposed inside the rear wall such that they are aligned between the third corner post 260 and the fourth corner post 264.

Figure 11:
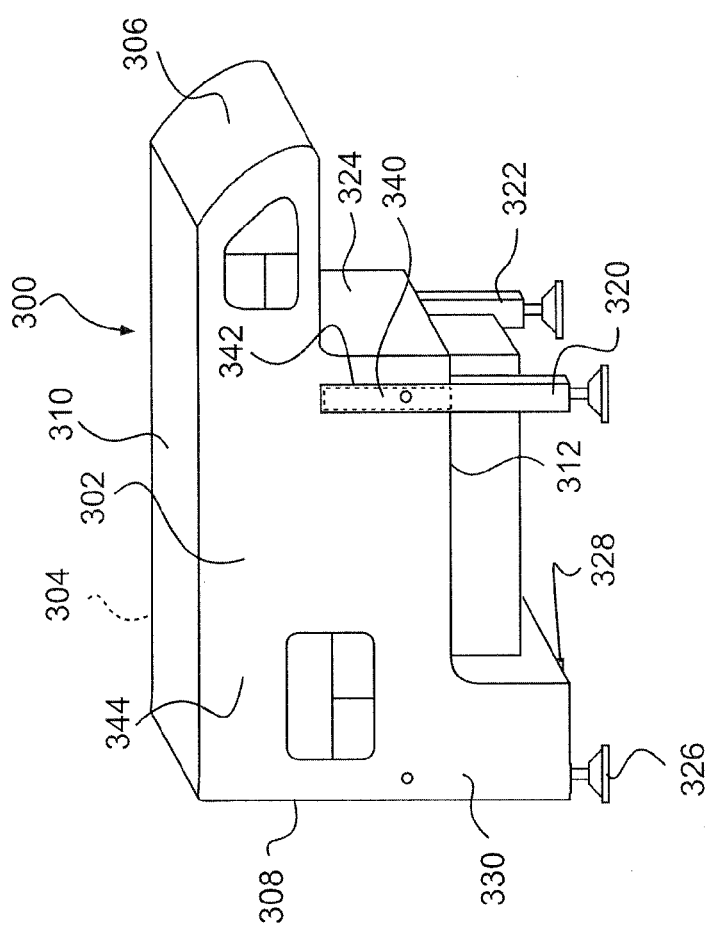
FIG. 11 is a perspective view of another embodiment of a camper.

Referring to FIG. 11, there is shown another embodiment of a pick-up truck camper 300. The camper 300 may comprise a first sidewall 302, a second sidewall 304, a front wall 306, a rear wall 308, a top wall 310, and a bottom wall 312, wherein the walls cover a frame. Each wall 302, 304, 306, 308, 310, 312 of the camper may have an inner wall and an outer wall. The camper may include a first jack 320 and a second jack 322 located at the front 324 of the camper 300. The camper 300 may further include a third jack 326 and a fourth jack 328 located at the rear 330 of the camper 300.

Figure 12:
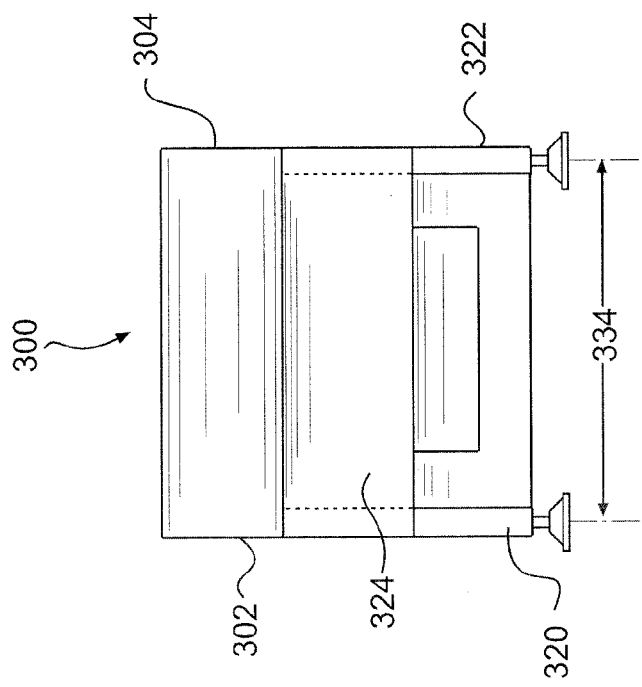
FIG. 12 is a front elevational view of the camper of FIG. 11.
Figure 14:
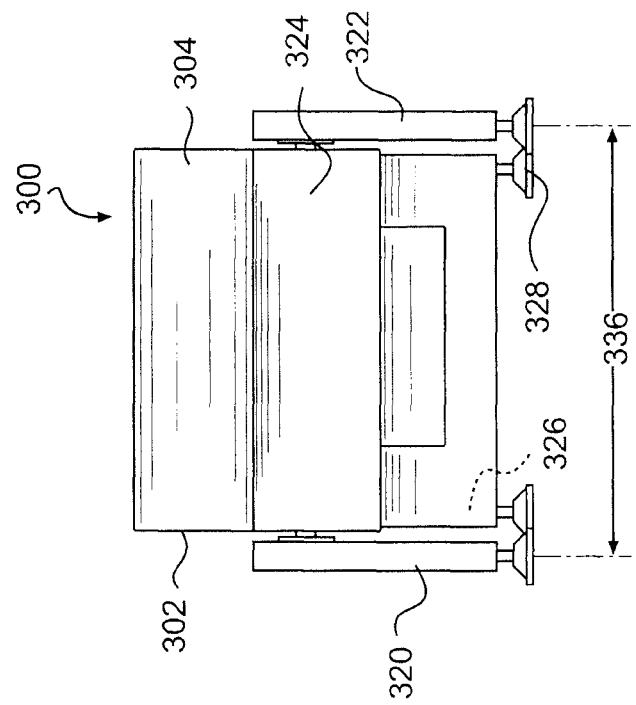
FIG. 14 is the same view as FIG. 12, but the front jacks have been extended.
Figure 13:
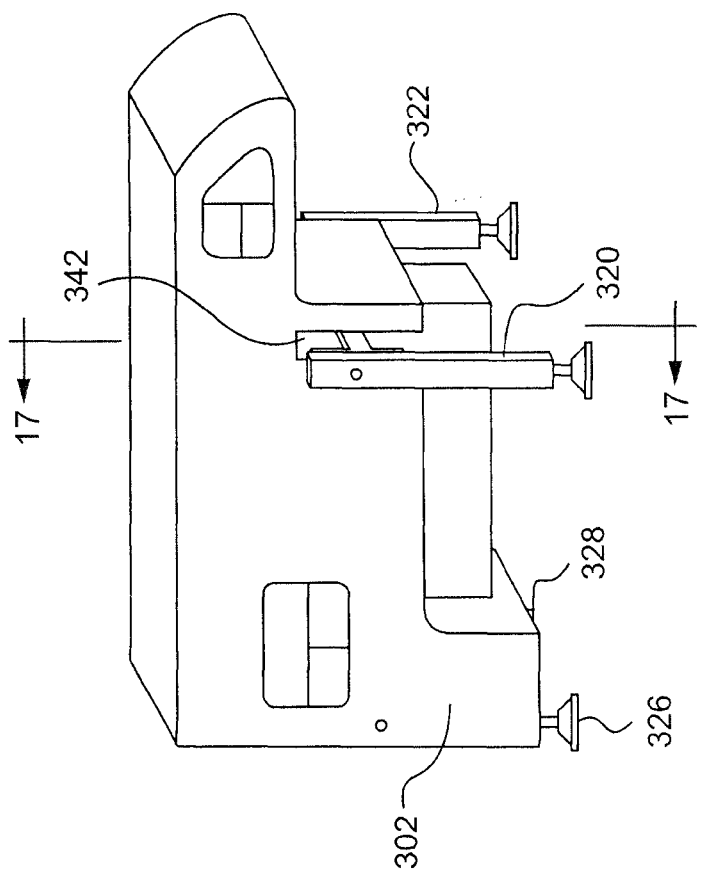
FIG. 13 is the same view as FIG. 11, but the front jacks have been extended.

Referring to FIG. 11, the first jack 320 may be a pull-out jack. The first jack 320 may be movable between a first position, shown in FIG. 11, in which the jack 320 is disposed inside the first sidewall 302 and a second position, shown in FIG. 13, in which the jack 320 extends out from the first sidewall 302. The second jack 322 may also be a pull-out jack movable between a first position, shown in FIG. 12, in which the jack is disposed inside the second sidewall 304 and a second position, shown in FIG. 14, in which the jack 322 extends out from the second sidewall 304. The first and second jacks 322, 324 may extend out in order to accommodate the rear end of a pick-up truck that may be wider than the distance 334 between the first and second jacks 320, 322 when the jacks 320, 322 are in their respective first positions. The first and second jacks 320, 322 may extend out to separate by a distance 336. Accordingly, the camper 300 may posses the advantageous qualities of a camper 300 with first and second jacks 320, 322 that are internal to the sidewalls 302, 304 of the camper 300, while being compatible to use with trucks of various widths, including those with large widths. Referring to FIGS. 12 and 14, the distance 336 between the first and second jacks 320, 322 may be at least eight inches greater when the jacks 320, 322 are both in their respective second positions than the distance 334 between the jacks 320, 322 when the jacks 320, 322 are in their respective first positions. In other embodiments, the distance 336 between the first and second jacks 320, 322 may be at least twelve inches greater when the jacks 320, 322 are both in their respective second positions than the distance 334 between the jacks 320, 322 when the jacks 320, 322 are in their respective first positions.

Figure 15:
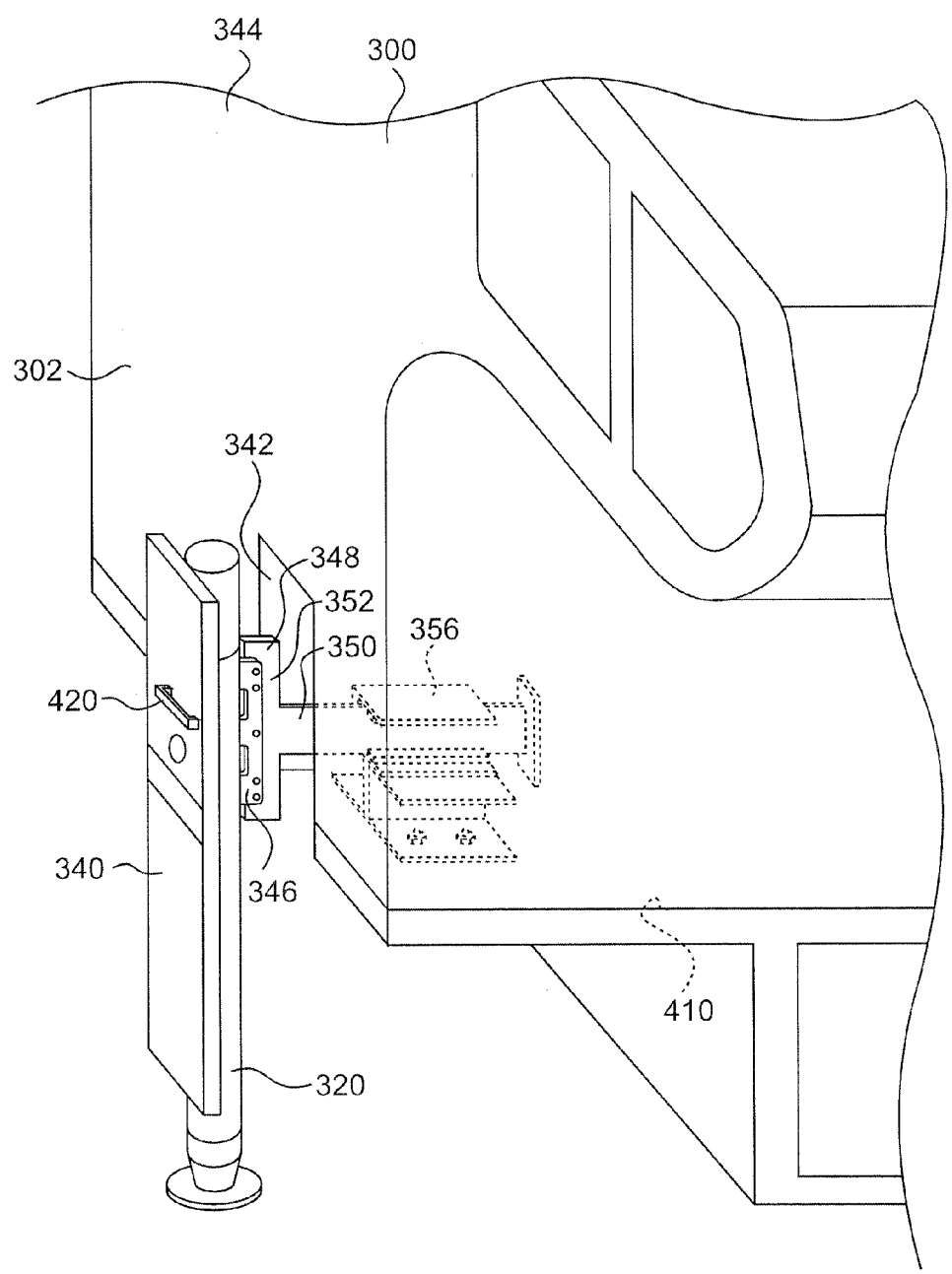
FIG. 15 is a partial perspective view of the camper of FIG. 11.

The first jack and the second jack 320, 322 may be similarly configured and similarly mounted to the pick-up truck camper. Accordingly, only the first jack 320 will be described in detail. Referring to FIG. 15, the first jack 320 may be similarly configured to the first jack 110 of FIG. 3, but the jack 320 may include a different mounting and additional components. The jack 320 may include a wall portion 340 on the outer side of the jack 320. The first sidewall 302 of the camper 300 may include a recess 342 which is configured to receive the first jack 320 when the jack 320 is in the first position. The wall portion 340 may be consistent with the outer wall 344 of the first sidewall 302 such that when the jack 320 is in the first position inside the recess 342, the wall portion 340 will be flush with and blend in with the first sidewall 302 of the camper 300, as shown in FIG. 11.

Referring to FIG. 15, the first jack 320 may also include a flange 346 disposed on the inner side of the jack 320. The flange 346 may be attached to the first distal end 348 of an extension arm 350. The first distal end 348 of the extension arm 350 may comprise a vertical bar 352 to which the flange 346 may be bolted. The extension arm 350 may be slidably engaged with a channeled member 356, the channeled member 356 being disposed proximate the recess 342 within the camper 300.

Figure 16:
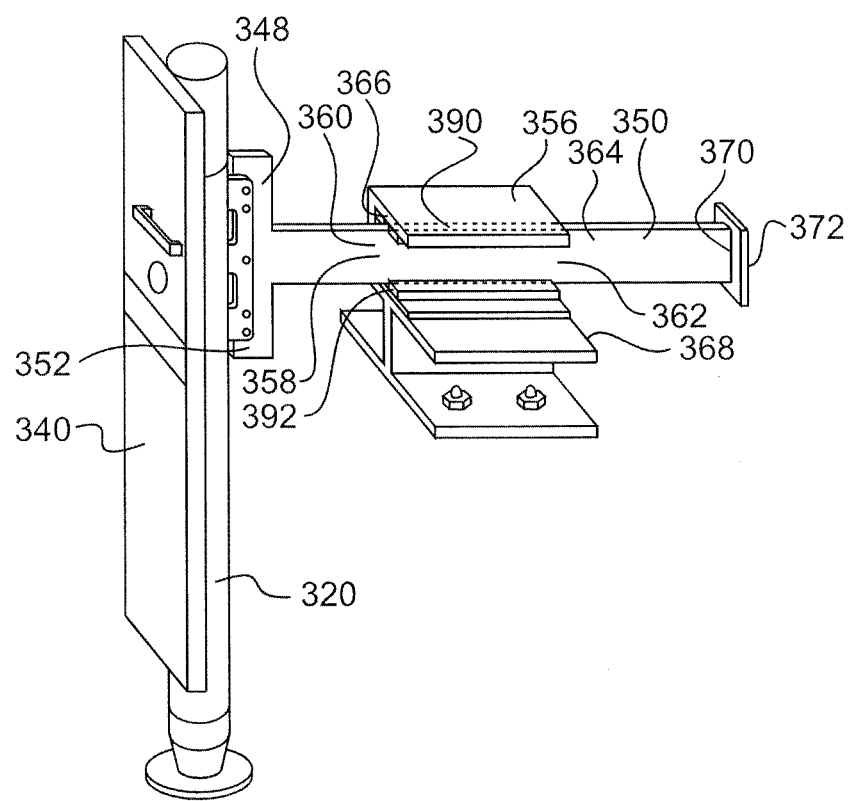
FIG. 16 is a perspective view of a jack constructed in accordance with principles of the present disclosure and a mounting of the camper of FIG. 11.

Referring to FIG. 16, the channeled member 356 may generally be a walled housing including a passageway 358, the passageway 358 extending from a first opening 360 to a second opening 362. The body portion 364 of the extension arm 350 may pass through the passageway 358 such that the first distal end 348 of the extension arm 350 is located on a first side 366 of the channeled member 356 and a second distal end 370 of the extension arm 350 is located on a second side 368 of the channeled member 356. The second distal end 370 of the extension arm 350 may include a plate 372. The vertical bar 352 and the plate 372 of the extension arm 350 may each be larger than the first and second openings 360, 362, respectively, in at least one dimension. Accordingly, the vertical bar 352 and the extension plate 372 may be physically prevented from entering the channeled member 356, thereby retaining the extension bar 350 in the passageway 358.

Figure 20:
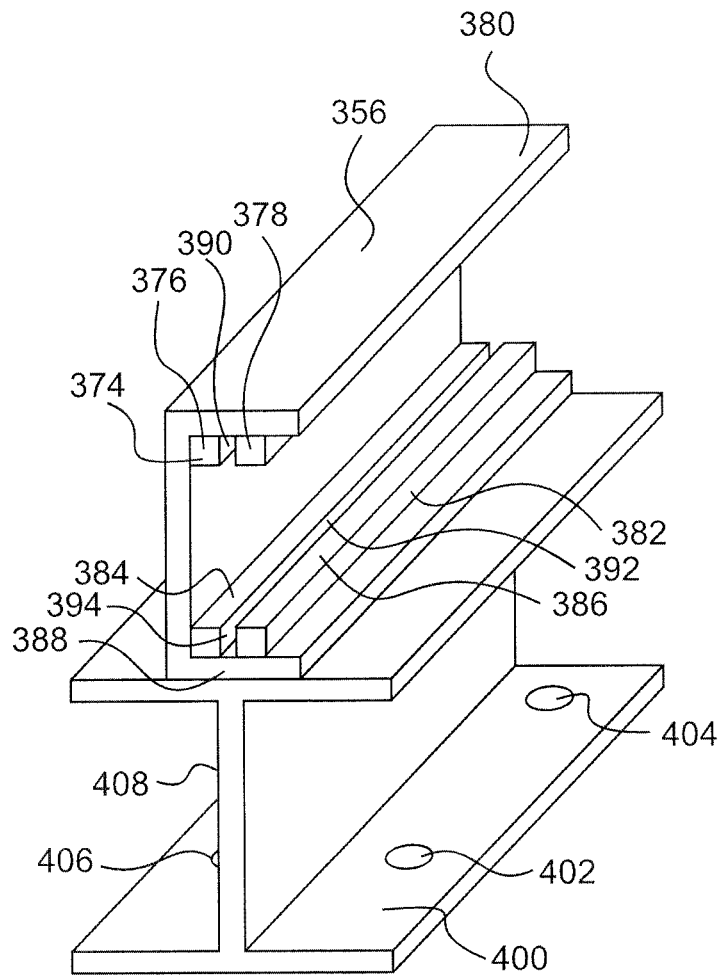
FIG. 20 is a perspective view of a mounting of the camper of FIG. 11.
Figure 24:
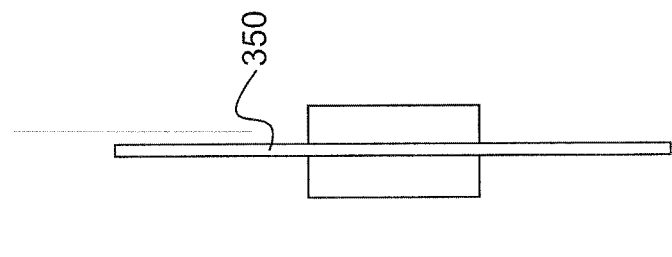
FIG. 24 is a side view of an extension arm of the camper of FIG. 11.
Figure 23:
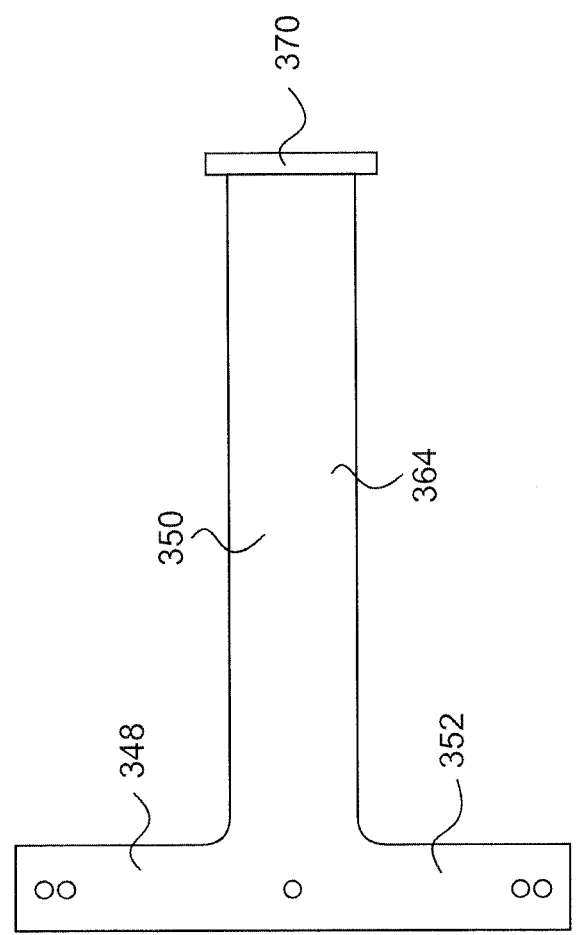
FIG. 23 is a front view of an extension arm of the camper of FIG. 11.

Referring to FIG. 20, the channeled member 356 may include a first pair 374 of ribs 376, 378 on an upper wall 380 and a second pair 382 of ribs 384, 386 on a lower wall 388. There is a first gap 390 between the first pair 374 of ribs 376, 378 and a second gap 392 between the second pair 382 of ribs 384, 386. The first and second gaps 390, 392 may align to form a channel 394 for receiving the extension arm 350, as shown in FIG. 16. Referring to FIG. 20, the channeled member 356 may be mounted on an I-beam member 400. The I-beam member 400 may include a plurality of bolt holes 402, 404, 406, 408 to receive bolts. Referring to FIG. 15, the bolts may bolt the I-beam to an internal surface 410 of the camper.

Figure 18:
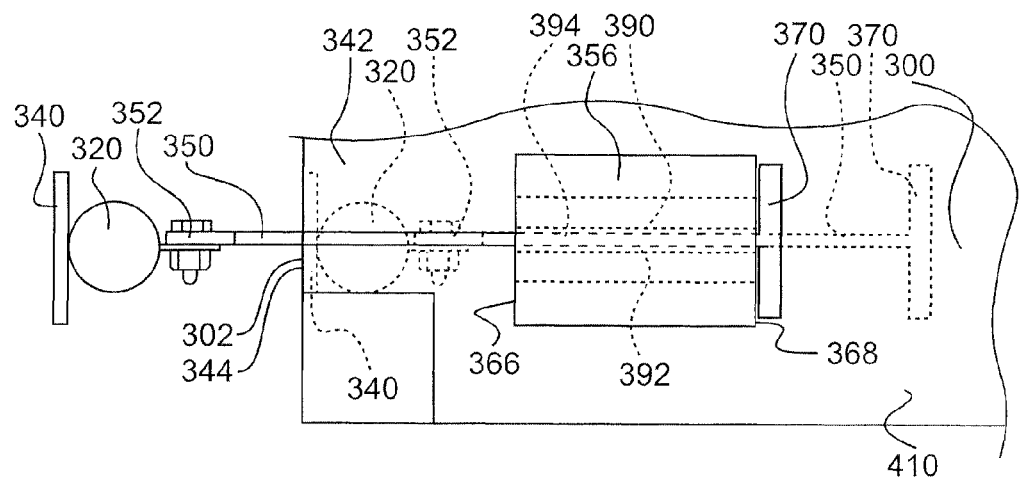
FIG. 18 is a top plan view of a jack and a mounting of the camper of FIG. 11.

Referring to FIG. 18, the extension arm 350 may be slidably disposed within the channel 394 of the channeled member 356. Accordingly, the jack 320 may travel between the first position and the second channel depending upon where the extension 350 is along its path of travel within the channeled member 356. When the vertical bar 352 is disposed against the first side 366 of the channeled member 356, as shown by the dotted lines in FIG. 18, the jack 320 may be within its first position wherein the wall portion 340 is aligned with the exterior 344 of the camper 320. When the plate 370 of the extension arm 350 is disposed against the second side 368 of the channeled member 356, as shown by the solid lines of FIG. 18, the jack 320 may be in the second position with the jack 320 fully extended out from camper 300. The extension arm 350 may travel within the channeled member 356 to position the jack 320 to any point between the first and second position.

Referring to FIG. 15, the wall portion 340 of the jack 320 may include a handle 420. An operator may use the handle 420 to move the jack 320 between the first position and the second position. This is possible because the channel 394 of the channeled member 356 is configured to permit the sliding of the extension arm 350 relative to the channeled member. The channeled member may be configured such that there is minimal friction between the extension arm 350 and the channel 394.

Figure 19:
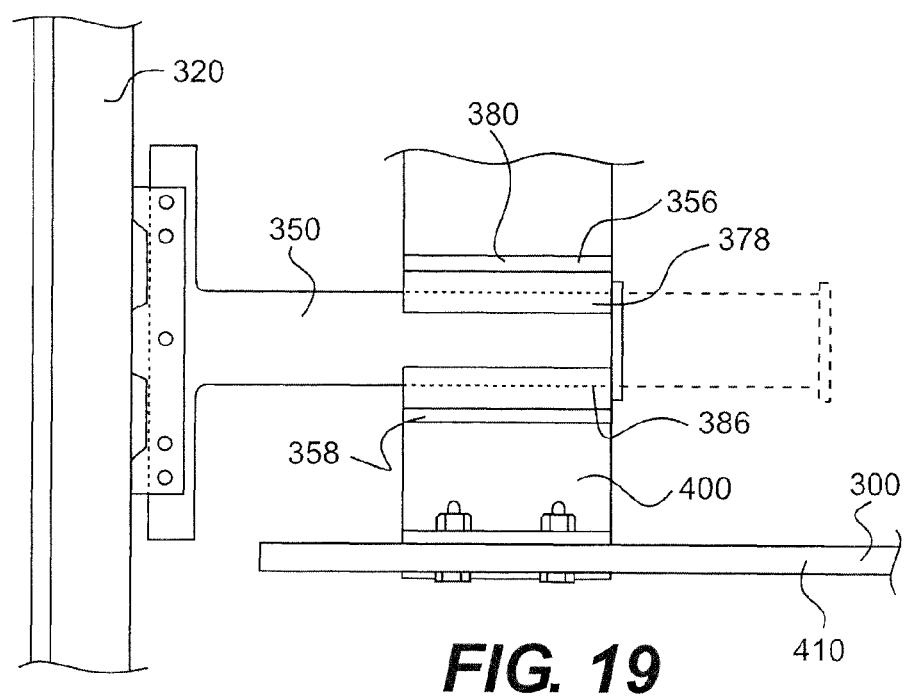
FIG. 19 is an enlarged, detail view of a jack constructed in accordance with principles of the present disclosure and a mounting of the camper of FIG. 11.

Referring to FIGS. 18 and 19, the channel 394 may be narrow enough to ensure that the extension arm 350 travels a straight path relative to the channel 394, wherein the roll, yaw, and pitch is restricted by the fit of the extension arm 350 within the channel 394. The path of travel of the extension arm 350 may also be substantially perpendicular to the outer wall 320 of the camper 300. Accordingly, the jack 320 can consistently leave from and return to the recess 342 as it is moved between the first and second positions. In other embodiments the jack may be moved between the first position and the second position by other means such as, for example, hydraulics or an electrical motor.

Figure 17:
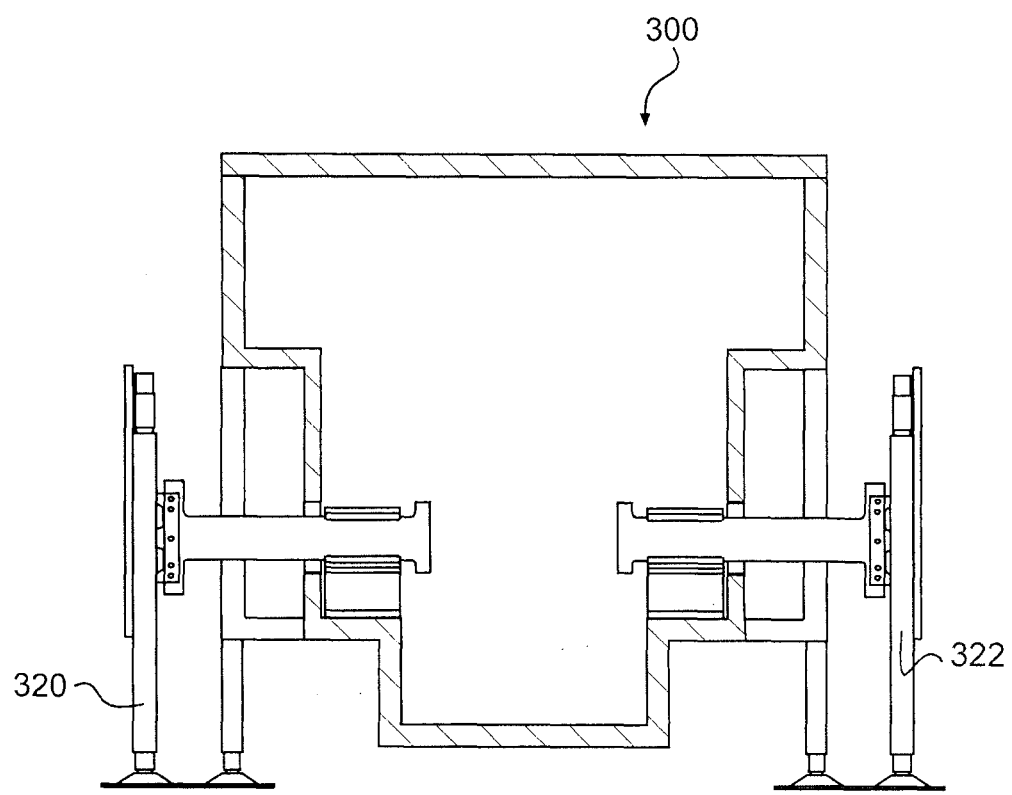
FIG. 17 is a cross-sectional view of the camper of FIG. 11 taken along line 17-17 in FIG. 13.

Referring to FIG. 17, the second jack 322 may be mounted to the camper in a mirror image of the first jack 320. Accordingly, the jacks 320, 322 may be moved towards and away from each other in order to manipulate the distance between the first and second jacks 320, 322. The first jack 320 and the second jack 322 may be mounted independently from one another so that the positionings of the first jack 320 and the second jack 322 are independent of each other. In other embodiments, the first and second jacks may be mounted to the camper by a common mounting system. In one embodiment, the positioning of the first and second jacks may be correlated. In another embodiment, the first and second jacks can be mounted on a pivot to swing out away from the camper side to increase the distance between the jacks to define a wider pickup truck entry.

Referring to FIG. 25, another embodiment of an in-line jack 410 is shown. The jack 410 includes a jack post 412 and an in-line drive assembly 414. The jack post 412 includes a body 416 in the form of an outer tube and an extendable shaft or lift tube 418 in the form of an inner tube disposed within the body 416. The jack post 412 and the in-line drive assembly 414 define a longitudinal axis 420 of the in-line jack 410.

The outer tubular body 416 includes first and second ends 424, 425. The body can 416 can include a mounting flange 426 having a plurality of mounting holes 427 adapted to receive a respective fastener therethrough to secure the body 416 to a structure (such as a wheel-less camper for example). With the structure mounted to the body 416, the in-line jack 410 can be used to raise and lower the structure relative to a supporting surface upon which the lift tube rests via movement of the lift tube 418.

The extendable shaft 418 has a lower distal end 430 that extends out of an opening 432 at the second end 425 of the outer tube 416. A foot 434 is located at the distal end 430 of the lift tube 418. The extendable shaft 418 is reciprocally movable along the longitudinal axis 420 relative to the body 416 over a range of travel between a retracted position (FIG. 25), in which the distal end 430 of the extendable shaft 418 is disposed a first distance 437 from the first end 424 of the body 416 along the longitudinal axis 420, and an extended position (FIG. 26), in which the distal end 430 of the extendable shaft 418 is disposed a second distance 438 from the first end 424 of the body 416 along the longitudinal axis 420. The second distance 438 is greater than the first distance 437.

Referring to FIG. 25, the in-line drive assembly 414 is mounted to the first end 424 of the body 416 and is adapted to selectively move the extendable shaft or lift tube 418 with respect to the tubular body 416 such that the extendable shaft or lift tube 418 can be moved out of and into the body 416 over a range of travel between the extended position (FIG. 26) and the retracted position (FIG. 25). The in-line drive assembly 414 is substantially aligned with the body 416 along the longitudinal axis 420 of the in-line jack 410 such that the drive assembly 414 extends substantially along the longitudinal axis 420.

The in-line drive assembly 414 includes a motor 440 operably arranged with drive mechanics to selectively move the extendable shaft or lift tube 418 relative to the body 416 in an extending direction 444 (FIG. 25) along the longitudinal axis 420 and in a retracting direction 444 (FIG. 26) along the longitudinal axis 420. The drive mechanics are housed in a planetary gearbox 450, a manual crank box 452, and the jack post 412. The manual crank box 452 is mounted adjacent the first end 424 of the body 416 and also houses a coupler/decoupler mechanism. The planetary gearbox 450 is disposed between the motor 440 and the manual crank box 452. A mounting collar 455 is provided to secure elements of the drive assembly 414 to the jack post 412.

In some embodiments, the body 416 and the planetary gear and motor assembly 466 each have a generally cylindrical outer surface. In some embodiments, the motor 440, the planetary gearbox 450, the manual crank box 452, the body 416, and the extendable shaft 418 each has a generally cylindrical outer surface with an outer diameter equal to or less than about three inches. In some embodiments, each element of the jack 410 (except for the mounting collar 455 and the foot 434, in some embodiments) is confined to a cylindrical space no greater than about three inches in diameter. In some embodiments, the motor 440, the planetary gearbox 450, the manual crank box 452, and the body 416 and the extendable shaft 418 of the jack post 412 are confined to a cylindrical space no greater than about three inches in diameter.

In still other embodiments, the motor 440, the planetary gearbox 450, the manual crank box 452, and the body 416 and the extendable shaft 418 of the jack post 412 are substantially aligned with each other and are confined within a transverse cross-sectional area taken along a plane 457 perpendicular to the longitudinal axis 420 of the in-line jack 410 that does not exceed about nine square inches. For example, in some embodiments, the motor 440, the planetary gearbox 450, the manual crank box 452, and the body 416 and the lift tube 418 of the jack post 412 are disposed within a square-shaped cross-sectional area having a side equal to about three inches. In still other embodiments, the size and shape of the elements of the in-line jack 410 can be varied.

Figure 27:
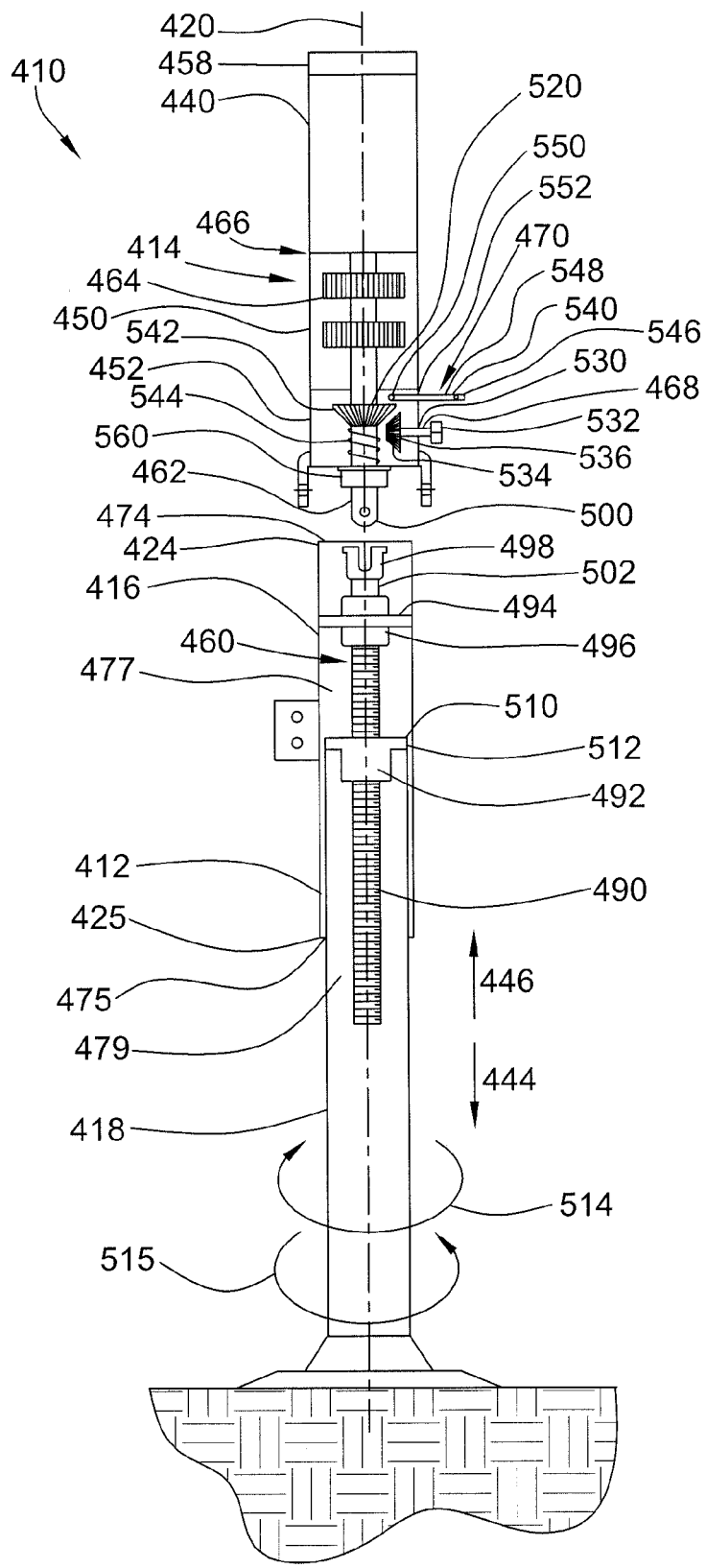
FIG. 27 is a partially exploded side view, partially in section, of the in-line jack of FIG. 25.

Referring to FIG. 27, the motor 440 can be any suitable motor, such as a reversible electrical motor. In one embodiment, the motor is a 6000 rpm, 12 volt DC, reversing motor. In some embodiments, an electric circuit breaker clutch 458 can be provided. In one embodiment, the circuit breaker clutch is a 30 amp electric circuit breaker clutch.

The drive mechanics of the in-line drive assembly 414 include a jackscrew assembly 460, a drive shaft 462, a planetary gear system 464 of a planetary gear and motor assembly 466, a crankshaft 468, and a coupling mechanism 470. The drive shaft 462 is operably arranged with the jackscrew assembly 460. The planetary gear system 464 is operably arranged with the drive shaft 462. The crankshaft 468 is adapted to manually operate the jackscrew assembly 460 via selective interaction with the drive shaft 462. The coupling mechanism 470 is adapted to selectively alternately couple the planetary gear system 464 with the drive shaft 462 and the crankshaft 468 with the drive shaft 462. The planetary gear system 466 is housed in the planetary gearbox 450. The coupling mechanism 470 and the crankshaft 468 are housed in the manual crank box 452.

Referring to FIG. 27, the first and second ends 424, 425 of the body 416 of the jack post 412 define respective openings 474, 475 in communication with an interior cavity 477. The extendable shaft 418 is movably disposed within the interior cavity 477 of the outer tube 416. The extendable shaft 418 telescopes in the tubular body 416 via the jackscrew assembly 460.

The jackscrew assembly 460 is disposed within the interior cavity 477 of the tubular body 416 and an interior cavity 479 of the extendable shaft or lift tube 418. The jackscrew assembly 460 is operably arranged with the body 416 and the extendable shaft 418 to selectively move the extendable shaft 466 with respect to the body 416. The jackscrew assembly 460 is attached to both the body 416 and the extendable shaft 418. The jackscrew assembly 460 is adapted to selectively move the extendable shaft 418 relative to the body 416 over a range of travel between the extended position (FIG. 26) and the retracted position (FIG. 25). The jackscrew assembly 460 is adapted to move the extendable shaft 418 relative to the outer body 416 along the longitudinal axis 420 in the retracting direction 446 so that the shaft 418 moves toward the retracted position and along the longitudinal axis 420 in the extending direction 444 so that the shaft 418 moves toward the extended position.

The jackscrew assembly 460 includes a threaded screw 490, which is supported by the body 416 and extends along the longitudinal axis 420, and a nut 492, which is secured to the extendable shaft 418. The screw 490 is threadingly engaged with the nut 492.

The screw 490 is centrally located axially with respect to the body 416 and the extendable shaft 418 and extends along the longitudinal axis 420 within the interior cavity 477 of the body 416 from a mounting plate 494 disposed adjacent the first end 424 of the body 416. The mounting plate 494 is fixedly connected to the body 416 by any suitable means, such as by being welded thereto, for example. The screw 490 is rotatably movable about its longitudinal axis with respect to the mounting plate 494 by means of a bearing 496. The bearing 496 is mounted to the mounting plate 494 and is fixedly disposed within the interior cavity 477 of the body 416 along the longitudinal axis 420. The screw 490 extends through the bearing 496. The screw 490 interacts with the bearing 496 such that the screw 490 is rotatable about its longitudinal axis and constrained from translating along its longitudinal axis with respect to the bearing 496.

The screw 490 includes a drive connector 498 which is adapted to engagingly receive a distal output end 500 of the drive shaft 462 such that rotation of the drive shaft 462 in one direction rotates the screw 490 in the same direction. The drive connector 498 is connected to an upper end portion 502 of the screw 490 which extends through the mounting plate 494.

The screw 490 is threadingly engaged with the nut 492 which is mounted to the extendable shaft 418. In some embodiments, the nut 492 is suitably supported at an upper end 510 of the extendable shaft 418 on an indented portion 512 so that the nut 492 is constrained from rotating and translating with respect to the extendable shaft 418 (see FIG. 34 also). In some embodiments, a screw or other fastener can be secured to the upper end 510 of the extendable shaft 418 and the nut 492 through an anti-rotation bore 513 to rotatively couple the nut 492 to the extendable shaft 418 such that relative rotation therebetween is constrained.

The nut 492 is threadingly engaged with the screw 490 such that rotation of the screw 490 in a first direction 514 about the longitudinal axis 420 moves the extendable shaft 418 in the extending direction 444 away from the first end 474 of the body 416 and such that rotation of the screw 490 in a second direction 515 moves the shaft in the retracting direction 446 toward the first end 474 of the body 416. In the illustrated embodiment, the screw 490 is turned in a clockwise direction to move the extendable shaft or lift tube 418 with respect to the body 416 in the extending direction 444. The screw 490 is turned in a counterclockwise direction to move the extendable shaft or lift tube 418 with respect to the body 416 in the retracting direction 446.

The drive shaft 462 includes an input end 520 that is selectively operably arranged with the planetary gear system 464 and the distal output end 500 which is engaged with the drive connector 498 of the screw 490 of the jackscrew assembly 460. The planetary gear and motor assembly 466 acts upon the input end 520 of the drive shaft 462 to turn the drive shaft 462 which in turn acts upon the screw 490 of the jackscrew assembly 460. The drive shaft 462 is operably arranged with the jackscrew assembly 460 to turn the screw 490 in the first direction (clockwise) 514 and the second direction (counterclockwise) 515. When the drive shaft 462 turns in the first direction (clockwise) 514, the screw 490 also turns in the first direction (clockwise) 514 and the extendable shaft 418 moves in the extending direction 444 toward the extended position. When the drive shaft 462 turns in the second direction (counterclockwise) 515, the screw 490 also turns in the second direction (counterclockwise) 515 and the extendable shaft 418 moves in the retracting direction 446 toward the retracted position.

The planetary gear and motor assembly 466 includes the motor 440 and the planetary gear system 464. The planetary gear and motor assembly 466 is mounted to the body 416 via the manual crank box 452 and the mounting collar 455 in the illustrated embodiment. In other embodiments, the planetary gear and motor assembly 466 can be mounted to the body 416 by other means. The planetary gear and motor assembly 466 is substantially axially aligned with the body 416. The planetary gear and motor assembly 466 is substantially parallel to the longitudinal axis 420.

The planetary gear system 464 is adapted to selectively rotate the drive shaft 462. The motor 440 is operably arranged with the planetary gear system 464 and is adapted to selectively drive the planetary gear system 464 to rotate the drive shaft 462 in either the first direction 514 or the second direction 515, which opposes the first direction 514, about the longitudinal axis 420. The planetary gear system 464, which is shown in schematic form in FIG. 27, can be any suitable gear system, such as one having a 30:1 gear ratio.

The motor 440, the planetary gear system 464, and the drive shaft 462 are adapted to selectively move the jackscrew assembly 460 such that the extendable shaft 418 is selectively movable with respect to the body 416 in the extending direction 444 and the retracting direction 446. The planetary gear and motor assembly 466 is operably arranged with the drive shaft 462 to selectively turn the screw 490 in the first direction (e.g., clockwise) 514 about the longitudinal axis 420 to extend the lift tube or extendable shaft 418 in the extending direction 444 relative to the body 416 and in the second direction 515, which opposes the first direction (e.g., counterclockwise), about the longitudinal axis 420 to retract the lift tube or extendable shaft 418 in the retracting direction 446 relative to the outer tube.

The components of the in-line drive assembly 414 and the jack post 412 are substantially aligned with each other. The illustrated jackscrew assembly 460, the drive shaft 462, the planetary gear system 464, and the motor 440 are concentrically arranged about the longitudinal axis 420. The body 416 and the planetary gear and motor assembly 466 are aligned such that those components of the in-line jack 410 have an outer diameter equal to or less than about three inches.

The manual crank box 452 is adjacent the first end 424 of the body 416. The manual crank box 452 is disposed between the planetary gearbox 450 and the jackscrew assembly 460. The manual crank box 452 houses the crankshaft 468 which is adapted to manually selectively drive the jackscrew assembly 460 via interaction with the drive shaft 462. The manual crank box 452 includes a crankshaft port 530 through which the crankshaft 468 extends.

An input end or crank drive stub 532 of the crankshaft 468 is disposed outside the manual crank box 452 and has a hexagonal shape suitable for being driven by a conventional tool, such as a lug wrench, socket wrench, pliers, drill, etc. The crankshaft 468 includes a drive gear 534 mounted to a distal end 536 thereof and disposed within the manual crank box 452. The drive gear 534 of the crankshaft 468 comprises a bevel gear.

The manual crank box 452 also houses the coupling mechanism 470 which is adapted to selectively disengage the drive shaft 462 from the planetary gear system 464 and engage the crankshaft 468 with the jackscrew assembly 460 via the drive shaft 462. The coupling mechanism 470 includes a decoupling rod 540, a driven gear 542 disposed concentrically about the drive shaft 462 and movably disposed with respect to the drive gear 534 of the crankshaft 468, and a spring 544 disposed about the drive shaft 462 and adapted to bias the driven gear 542 of the drive shaft 462 to move out of engaging relationship with the drive gear 534 of the crankshaft 468.

Figure 29:
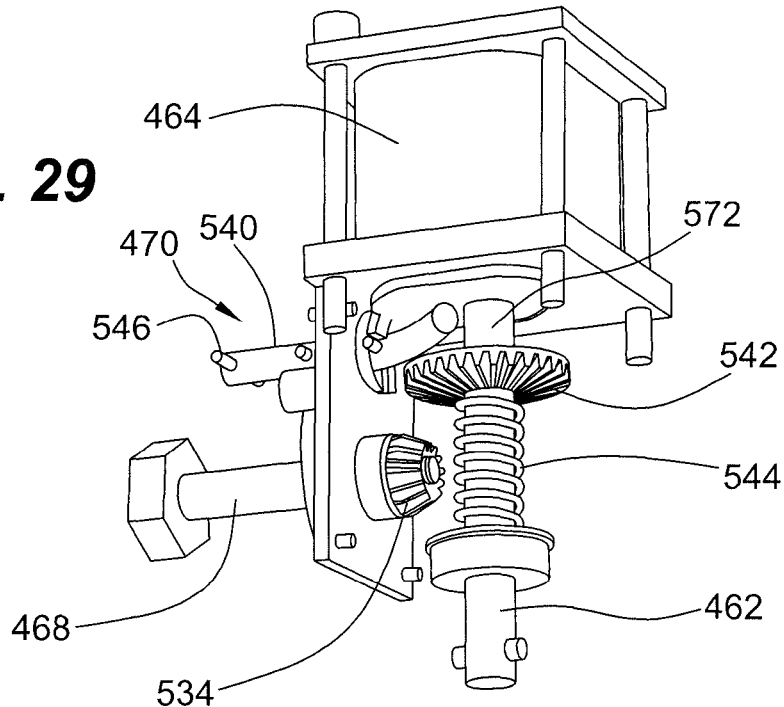
FIG. 29 is a perspective view of an embodiment of a planetary gearbox, a coupling mechanism, and a crankshaft for an in-line jack constructed in accordance with principles of the present disclosure.

The coupling mechanism 470 is movable over a range of travel between a coupled position and a decoupled position. When the coupling mechanism 470 is in the coupled position (as in FIGS. 27 and 29), the planetary gear system 464 and the drive shaft 462 are in operable arrangement with each other such that movement of the gears of the planetary gear system 464 via the motor 440 moves the drive shaft 462. When the coupling mechanism 470 is in the coupled position (as in FIGS. 27 and 29), the driven gear 542 of the drive shaft 462 is disengaged from the drive gear 534 of the crankshaft 468.

The decoupling rod 540 includes an operating end 546 disposed outside of the manual crank box 452, a straight body segment 548, and a decoupling end 550 disposed within the manual crank box 452. The decoupling rod 540 extends through a coupling mechanism port 552 in the manual crank box 452. The operating end 546 and the decoupling end 550 can comprise bent segments that are in non-parallel relationship with the straight body segment 548. The operating end 546 is adapted to be gripped by a user to rotate the decoupling rod 540 to move the coupling mechanism 470 between the coupled position and the decoupled position. The decoupling end 550 is adapted to engage the driven gear 542 disposed about the drive shaft 462. When the coupling mechanism 470 is in the decoupled position, the decoupling end 550 engages the driven gear 542 such that the driven gear 542 of the drive shaft 462 is moved into enmeshing engagement with the drive gear 534 of the crankshaft 468. In other embodiments, the coupling mechanism 470 can implement a different design and/or structure which is adapted to selectively alternately couple the planetary gear system 464 with the drive shaft 462 and the crankshaft 468 with the drive shaft 462.

The crankshaft 468 and the drive shaft 462 are in non-parallel relationship with each other. In the illustrated embodiment, the crankshaft 468 and the drive shaft 462 are substantially perpendicular to each other. The driven gear 542 of the drive shaft 462 comprises a bevel gear which is configured to enmeshingly engage with the drive gear 534 of the crankshaft. In other embodiments, the crankshaft 468 and the drive shaft 462 can have a different orientation with respect to each other and the drive gear 534 and the driven gear 542 can have different complementary configurations.

The spring 544 is disposed about the drive shaft 462 between the driven gear 542 of the drive shaft 462 and a bearing 560 disposed about the drive shaft 462. The drive shaft 462 interacts with the bearing 560 such that the drive shaft 462 is rotatable about its longitudinal axis and constrained from translating along its longitudinal axis with respect to the bearing 560. The bearing 560 is suitably supported by the manual crank box 452 or other structure such that the bearing 560 is constrained from translating along the longitudinal axis 420 of the in-line jack 410 with respect to the planetary gear system 464. The spring 544 is adapted to bias the coupling mechanism 470 to the coupled position wherein the drive gear 534 of the crankshaft 468 and the driven gear 542 of the drive shaft 462 are disengaged.

Figure 30:
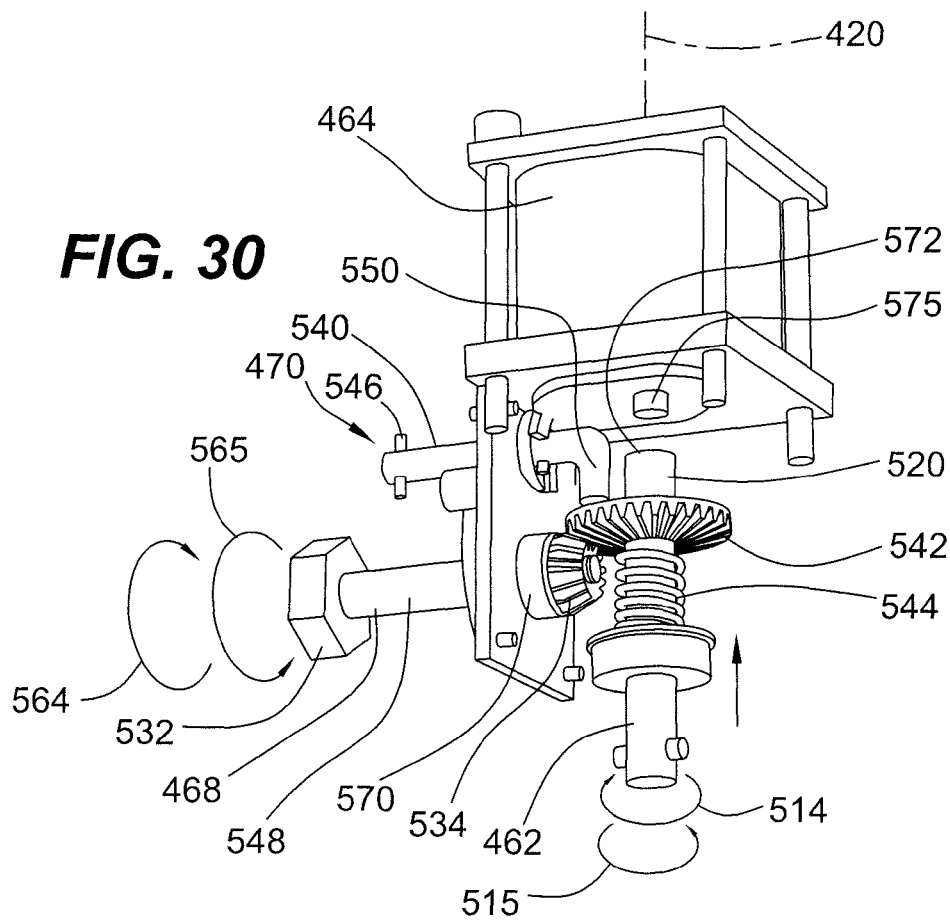
FIG. 30 is a perspective view of the planetary gearbox, the coupling mechanism, and the crankshaft as in FIG. 29, but with the coupling mechanism in a decoupled position.
Figure 31:
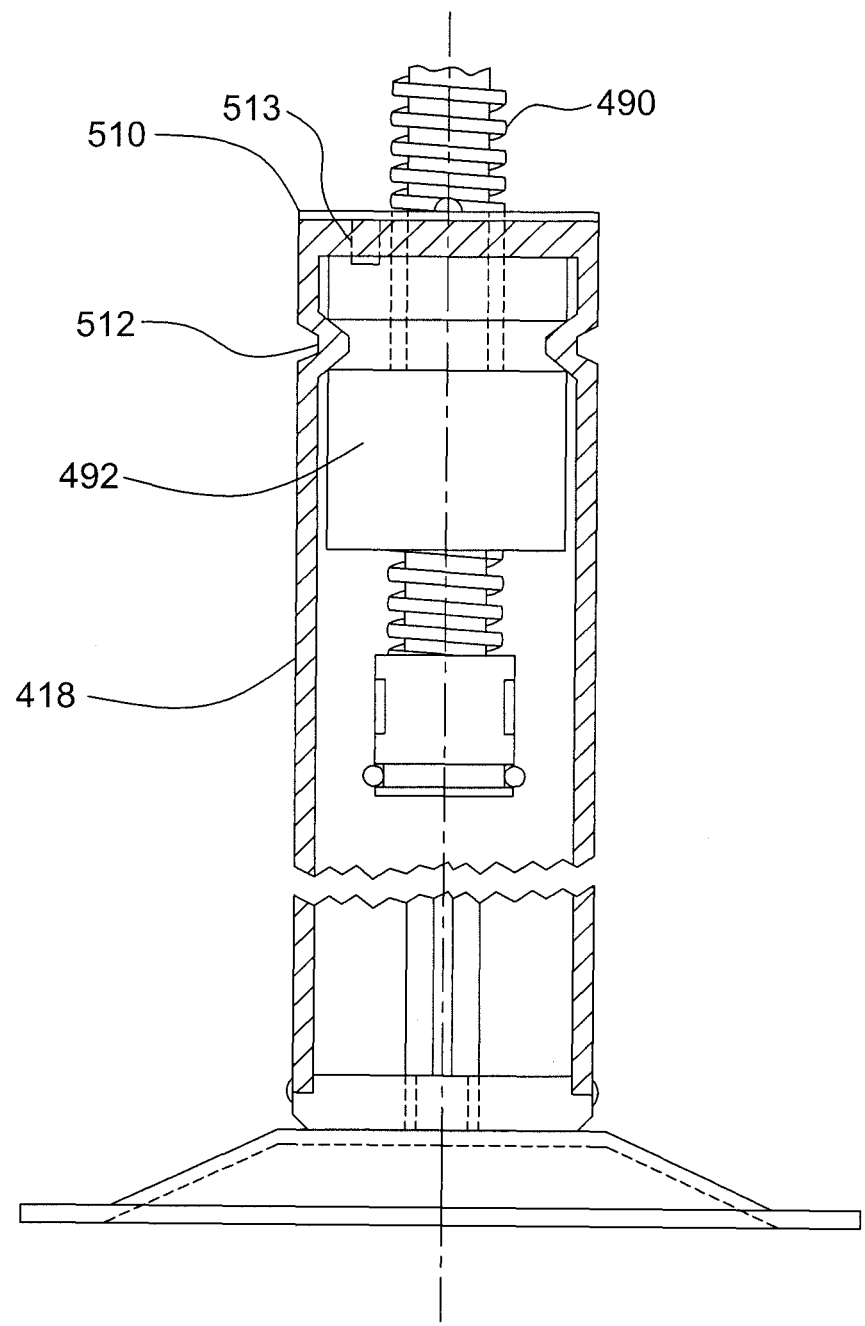
FIG. 31 is a fragmentary side view, in section, of an extendable shaft of a jack post and a fragmentary side view of a jackscrew assembly suitable for an in-line jack constructed in accordance with principles of the present disclosure.

Referring to FIG. 30, when the coupling mechanism 470 is moved to the decoupled position (as in FIG. 30), the coupling mechanism 470 disengages the drive shaft 462 from the planetary gear system 464 and moves the driven gear 542 of the drive shaft 462 into engaging relationship with the drive gear 534 of the crankshaft 468. In this position, the crankshaft 468 can be rotated using conventional tools, for example, in a first direction 564 and an opposing second direction 565 to turn the drive shaft in the first direction 514 and the second direction 515, respectively, about the longitudinal axis 420 of the in-line jack 410. When the crankshaft 468 is turned, the drive gear 534 rotates in the corresponding direction. The enmeshed driven gear 542 turns in response to the movement of the drive gear 534. The driven gear 542 is rotatively coupled with the drive shaft 462 such that rotating the driven gear 542 rotates the drive shaft 462. In the illustrated embodiment, the crankshaft 468 can be turned in the counterclockwise direction (facing the input end of the crankshaft) 564 to turn the drive shaft in the first (clockwise) direction 514 and turned in the clockwise direction (facing the input end of the crankshaft) 565 to turn the drive shaft in the second (counterclockwise) direction 515.

Referring to FIG. 30, a bearing 570 is disposed about the decoupling rod 540. The decoupling rod 540 interacts with the bearing 570 such that the decoupling rod 540 is rotatable about a longitudinal axis defined by the straight body segment 548 of the decoupling rod 540 and constrained from translating along its longitudinal axis with respect to the bearing 570.

The driven gear 542 can include a collar 572 that is adapted to engagingly couple with an output end 575 of the planetary gear system 464. The driven gear 542 and the collar 572 provide a generally T-shaped profile. The collar 572 and the output end 575 of the planetary gear system 464 can have complementary shapes such that the output end 575 is rotatively coupled with the collar 572 of the driven gear 542 when the coupling mechanism 470 is in the coupled position.

The input end 520 of the drive shaft 462 and at least some interior portion of the driven gear 542 can be configured such that they have complementary shapes so that the drive shaft 462 is rotatively coupled to the planetary gear system 464 when the coupling mechanism 470 is in the coupled position and in the decoupled position. In one arrangement, when the coupling mechanism 470 is in the coupled position, the output end 575 of the planetary gear system 464 is rotatively coupled with the collar 572 of the driven gear 542 and a portion of an interior surface of the driven gear 542 (including the collar 572 in some embodiments) is rotatively coupled with the drive shaft 462 such that rotation of the planetary gear system 464 rotates the drive shaft 462.

Referring to FIGS. 27 and 30, in use, the user turns the operating end 546 of the decoupling rod 540 to move the coupling mechanism 470 to the decoupled position (as in FIG. 30). Turning the operating end 546 of the decoupling rod 540 rotates the decoupling end 550 of the decoupling rod 540 which in turn acts upon the driven gear 542 of the drive shaft 462 such that the driven gear 542 of the drive shaft 462 moves along the longitudinal axis of the drive shaft 462 relative to and toward the drive gear 534 of the crankshaft 468 and relative to and away from the planetary gear system 464. The operating end 546 of the decoupling rod 540 can be so turned until the coupling mechanism 470 is moved to the decoupled position wherein the driven gear 542 of the drive shaft 462 is meshingly engaged with the drive gear 534 of the crankshaft 468 and the output end 575 of the planetary gear system 464 is disengaged from the input end 520 of the drive shaft 462 (see FIG. 30). In particular, the collar 572 of the driven gear 542 is disengaged from the output end 575 of the planetary gear system 464.

The user maintains the operating end 546 of the decoupling rod 540 in position so that the coupling mechanism 470 is in the decoupled position. The user can rotate the crankshaft 468 using conventional tools in either the first direction 564 or the opposing second direction 565 to turn the drive shaft 462 through the interaction of the enmeshed drive gear 534 and the driven gear 542, which is rotatively coupled with the drive shaft 462. The drive shaft 462, in turn, rotates in the first direction 514 and the second direction 515, respectively, about the longitudinal axis 420 of the in-line jack 410.

Once the user releases the operating end 546 of the decoupling rod 540, the spring 544 acts upon the driven gear 542 about the drive shaft 462 and urges it to move along the longitudinal axis 420 relative to and away from the drive gear 534 of the crankshaft 468 such that the coupling mechanism 470 returns to the coupled position (as in FIG. 29) in which the planetary gear system 464 is operably arranged with the drive shaft 462 to turn the drive shaft 462 when the planetary gear system 464 rotates and the drive gear 534 of the crankshaft 468 is disengaged from the driven gear 542 of the drive shaft 462. In this position, the collar 572 of the driven gear 542 is rotatively coupled with the output end of the planetary gear system 464 to rotatively couple the planetary gear system 464 with the drive shaft 462.

Figure 28:
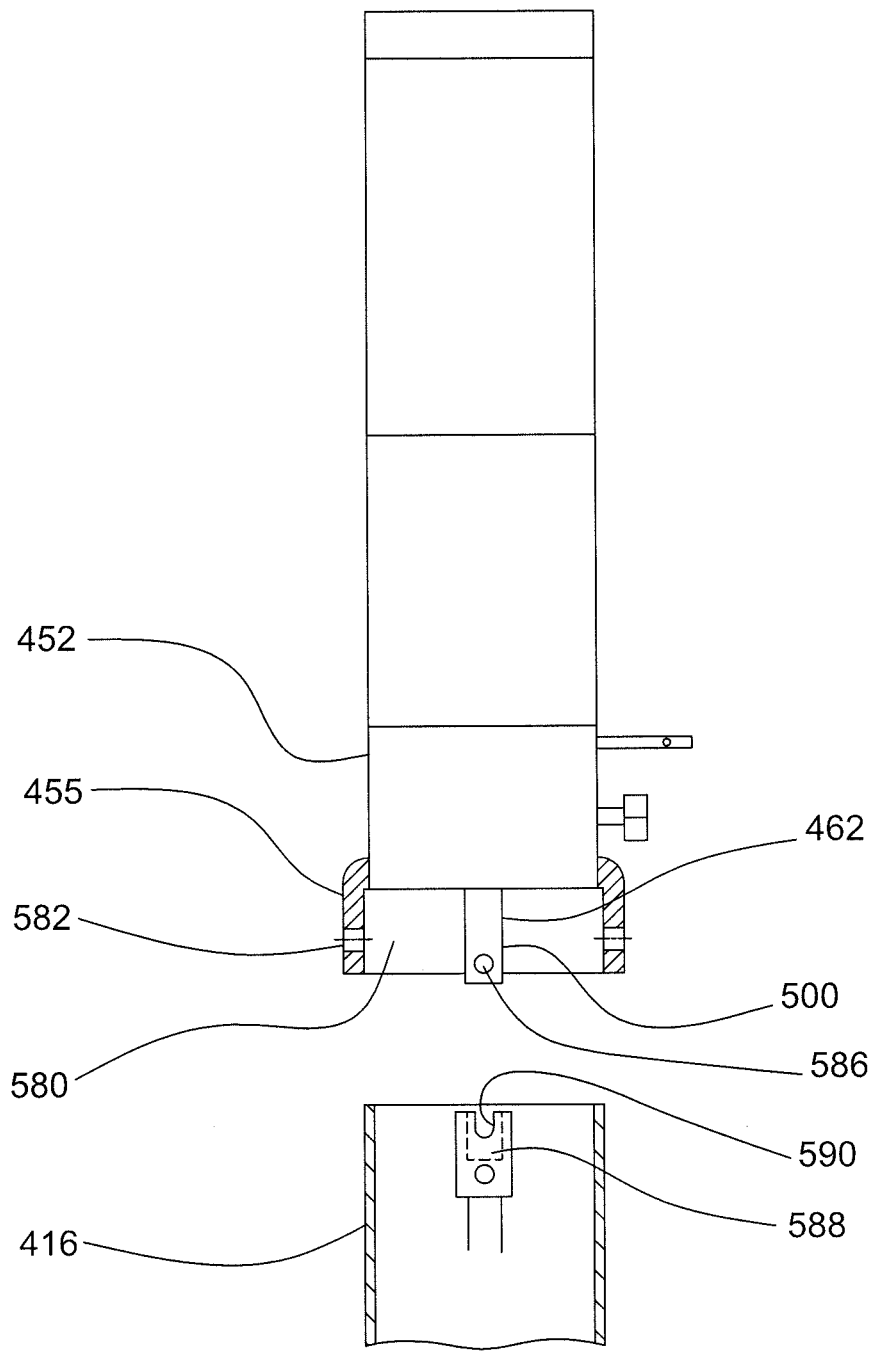
FIG. 28 is a side elevational view of a drive assembly, partially in section, and a fragmentary side view, in section, of a jack post of the in-line jack of FIG. 25.

Referring to FIG. 28, the mounting collar 455 is mounted to the manual crank box 452, such as, by being welded thereto, for example. The mounting collar 455 defines an internal chamber 580. The mounting collar 455 is adapted to be removably mounted to the tubular body 416. The mounting collar 455 includes a plurality of mounting holes 582 through which a respective fastener can extend to secure the mounting collar 455 to the body 416 of the jack post 412.

The distal output end 500 of the drive shaft 462 is disposed within and adjacent the internal chamber 580 of the mounting collar 455. The distal output end 500 of the drive shaft 462 includes a pin 586 projecting outwardly from opposing sides of the drive shaft 462 (see FIG. 34 also). The drive connector 498 of the screw 490 of the jackscrew assembly 460 defines a socket 588 adapted to receive the distal output end 500 of the drive shaft 462 therein. The drive connector 498 can include a slotted end 590 that is adapted to receive therein the pin 586 projecting from the drive shaft 462. The inter-engagement of the pin 586 and the slotted end 500 of the drive connector 498 of the screw provide a positive connection therebetween such that the drive shaft 462 and the screw 490 of the jackscrew assembly 460 are rotatively coupled together.

Figure 32:
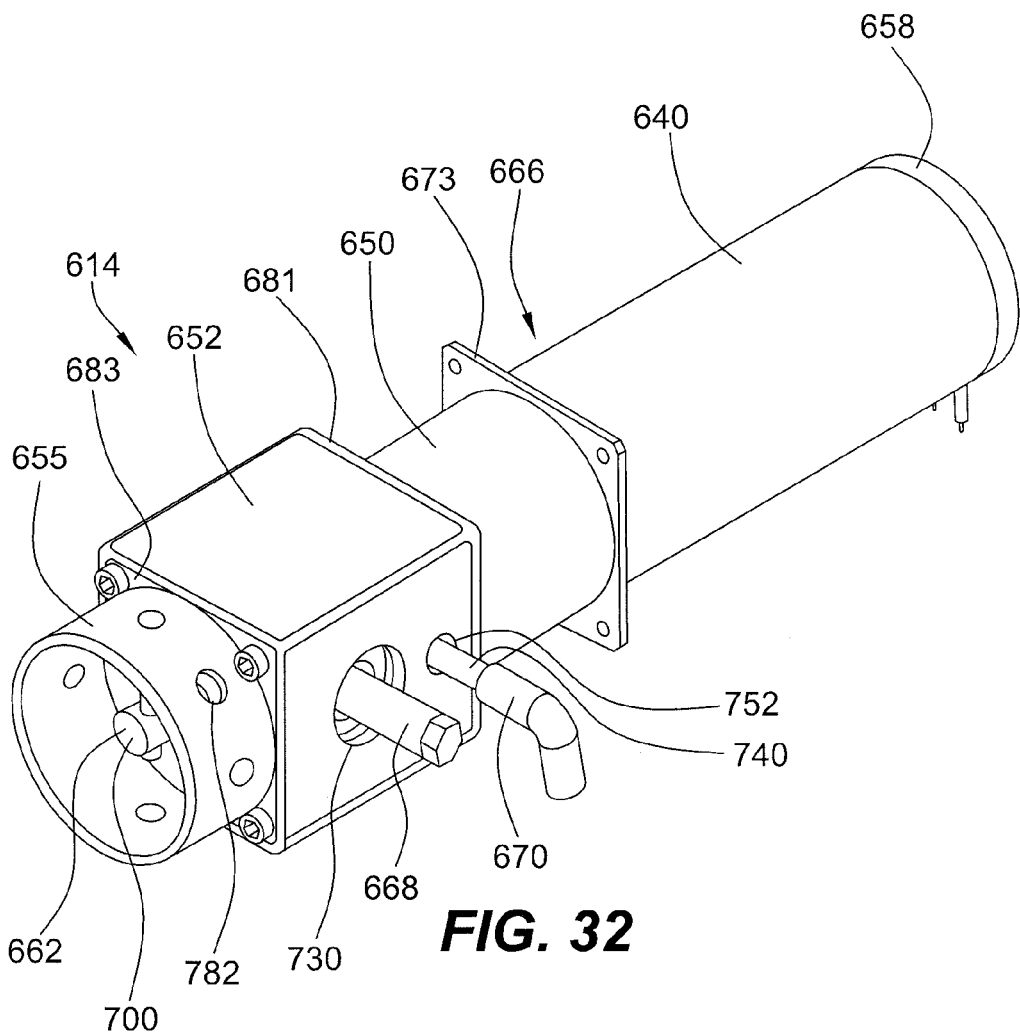
FIG. 32 is a perspective view of an embodiment of a drive assembly suitable for an in-line jack constructed in accordance with principles of the present disclosure.
Figure 33:
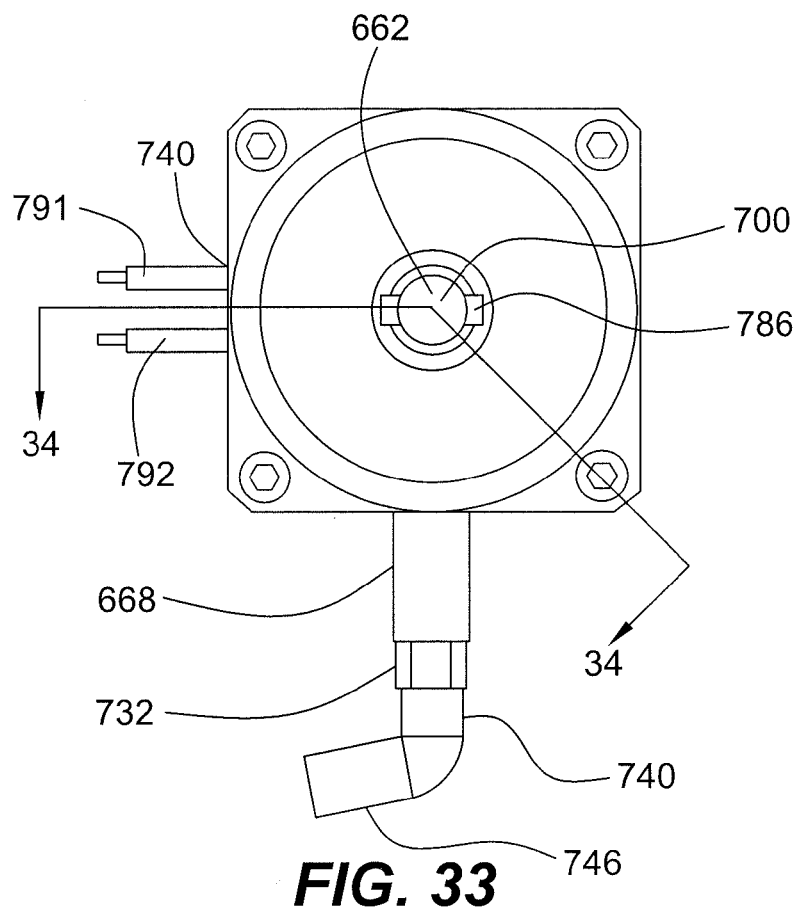
FIG. 33 is an end view of the drive assembly of FIG. 32.
Figure 34:
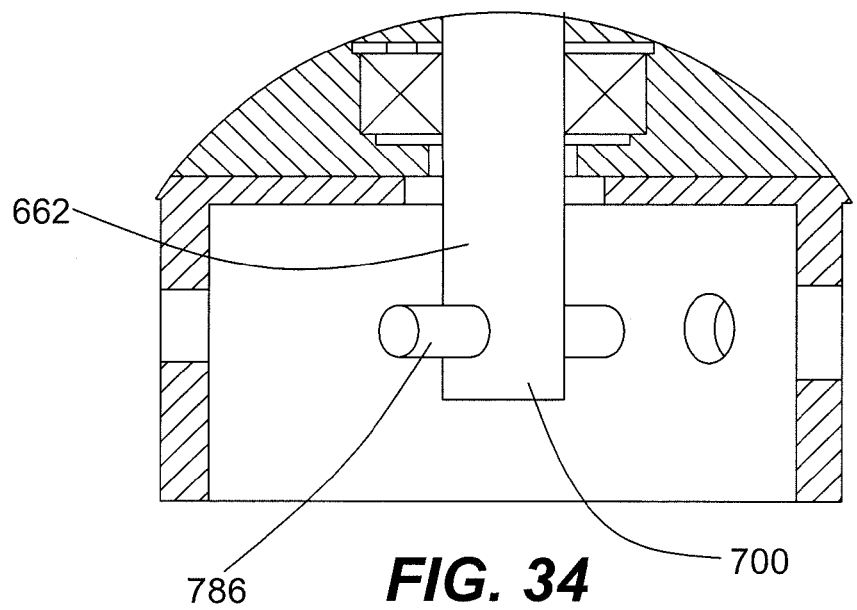
FIG. 34 is a cross-sectional view taken along line 34-34 in FIG. 33.

Referring to FIGS. 32-34, another embodiment of components of an in-line drive assembly 614 is shown. The in-line drive assembly 614 includes a drive shaft 662, a planetary gear and motor assembly 666, a crankshaft 668, and a coupling mechanism 670. The crankshaft 668 and the coupling mechanism 670 are housed in a manual crank box 652. A mounting collar 655 is attached to the manual crank box.

The drive shaft 662 of the in-line drive assembly 614 in FIG. 32 is similar to the drive shaft 462 of the in-line drive 414 in FIGS. 25-27 with respect to its construction and function. The planetary gear and motor assembly 666 includes a motor 640 with an electric circuit breaker clutch 658, a planetary gear system housed in a planetary gearbox 650, and a mounting plate 673 disposed between the motor 640 and the planetary gearbox 650 to facilitate the assembly of the in-line drive assembly 614.

The mounting plate 673 includes a plurality of mounting holes 676 through which a respective fastener can extend to secure the manual crank box 652 to the planetary gear box 650. The mounting plate 673 has a generally square shape. In some embodiments, the length of the sides of the mounting plate 673 is equal to or less than three inches. The planetary gear and motor assembly 666 of the in-line drive assembly 614 in FIG. 32 is similar in other respects to the planetary gear and motor assembly 466 of the in-line drive 414 in FIGS. 25-27 with respect to its construction and function.

The manual crank box 652 includes a crankshaft port 730 through which the crankshaft 668 extends and a coupling mechanism port 752 through which a decoupling rod 740 of the coupling mechanism 670 extends. The manual crank box 652 is generally cube-shaped and includes a top end plate 681 and a bottom end plate 683 that are substantially square-shaped. Fasteners can be secured to the mounting plate 673 of the planetary gear and motor assembly 666 and the top end plate 681 of the manual crank box 652 to attach the manual crank box 652 to the planetary gear and motor assembly 666.

The top and bottom end plates 681, 683 of the manual crank box 652 are substantially the same shape and size as the mounting plate 673 of the planetary gear and motor assembly 666. In some embodiments, the length of the sides of the top and bottom end plates of the manual crank box is equal to or less than three inches. The crankshaft 668 and the coupling mechanism 670 of the in-line drive assembly 614 in FIG. 32 are similar in other respects to the crankshaft 468 and the coupling mechanism 470 of the in-line drive 414 in FIGS. 25-27, 29, and 30 with respect to its construction and function.

The mounting collar 655 is generally cylindrical and is adapted to be secured to a suitable jack post have a jackscrew assembly therein adapted to be drivingly engaged with a distal output end 700 of the drive shaft 662. In some embodiments, the diameter of the mounting collar 655 is equal to or less than three inches. The mounting collar 655 includes a plurality of mounting holes 782 adapted to receive a respective fastener therethrough which connects the collar 655 to a body of a suitable jack post.

Referring to FIG. 33, the motor 640 includes a pair of lead wires 791, 792 adapted to electrically connect the motor 640 to an electrical power source. An operating end 746 of the decoupling rod 740 extends outwardly beyond an input end or crank drive stub 732 of the crankshaft 668. Referring to FIGS. 33 and 34, the drive shaft 662 includes a includes a pin 786 adjacent the distal output end 700 of the drive shaft 662. The pin 786 projects radially outwardly from opposing sides of the drive shaft 662. The pin 786 can be adapted to be engaged with a slotted end of a suitable drive connector of a screw of a jackscrew assembly to provide a positive connection between the drive shaft 662 and the screw of the jackscrew assembly.

It will be appreciated that embodiments of the jacks and their respective mountings and components, such as the coupling mechanism, for example, which have been described herein are merely exemplary embodiments. The desired features and functions of the above described jacks may be realized by various other embodiments that employ different jack features, fastening means, mounting assemblies, motion control systems, or mechanical, electrical, and hydraulic systems and components.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An in-line jack comprising:
 a tubular body with first and second ends, the tubular body extending along a longitudinal axis;
 an extendable shaft disposed within the body and reciprocally movable along the longitudinal axis relative to the body;
 a drive assembly mounted to the first end of the body, the drive assembly extending substantially along the longitudinal axis, the drive assembly adapted to selectively move the shaft with respect to the body over a range of travel between a retracted position, in which a distal end of the shaft is disposed a first distance from the first end of the body along the longitudinal axis, and a retracted position, in which the distal end of the shaft is disposed a second distance from the first end of the body along the longitudinal axis, the second distance being greater than the first distance, the drive assembly including a jack screw assembly attached to the body and the shaft and adapted to selectively move the shaft relative to the body along the longitudinal axis in a retracting direction so that the shaft moves toward the retracted position and an extending direction so that the shaft moves toward the extended position, a drive shaft operably arranged with the jack screw assembly to move the jackscrew assembly, a planetary gear system adapted to rotate the drive shaft, and a motor operably arranged with the planetary gear system and adapted to selectively drive the planetary gear system to rotate the drive shaft;

wherein the motor, the planetary gear system, and the drive shaft are adapted to selectively move the jack screw assembly such that the extendable shaft is selectively movable with respect to the tubular body in the extending direction and the retracting direction; and wherein the jack screw assembly, the drive shaft, the planetary gear system, and the motor are concentrically arranged about the longitudinal axis.

2. The in-line jack of claim 1, further comprising:
a planetary gearbox housing the planetary gear system;
a manual crank box disposed between the planetary gearbox and the jackscrew, the manual crank box housing a crankshaft adapted to manually selectively drive the jackscrew assembly.

3. The in-line jack of claim 2, wherein the manual crank box includes a coupling mechanism adapted to selectively disengage the drive shaft from the planetary gear system and engage the crankshaft with the jackscrew assembly.

4. The in-line jack of claim 3, wherein the crankshaft includes a drive gear mounted to an end thereof, the drive shaft includes a driven gear disposed concentrically about the drive shaft, and the coupling mechanism is movable over a range of travel between a coupled position and a decoupled position, wherein, when the coupling mechanism is in the coupled position, the planetary gear system and the drive shaft are rotatively coupled together and the driven gear of the drive shaft is disengaged from the drive gear of the crankshaft, and wherein, when the coupling mechanism is moved to the decoupled position, the coupling mechanism disengages the planetary gear system from the drive shaft and moves the driven gear of the drive shaft into engaging relationship with the drive gear of the crankshaft to rotatively couple the crankshaft with the drive shaft.

5. The in-line jack of claim 4, wherein the drive gear of the crankshaft and the driven gear of the drive shaft comprise bevel gears, and the crankshaft and the drive shaft are in non-parallel relationship with each other.

6. The in-line jack of claim 2, wherein the motor, the planetary gearbox, the manual crank box, the body, and the extendable shaft each has a generally cylindrical outer surface with an outer diameter equal to or less than about three inches and are substantially aligned with each other.

7. The in-line jack of claim 2, further comprising:
a mounting collar attached to the manual crank box, the mounting collar defining an internal chamber, the drive shaft including a distal output end, the distal end of the drive shaft disposed within the internal chamber of the mounting collar, the mounting collar adapted to be removably mounted to the interior cavity of the tubular body.

8. The in-line jack of claim 7, wherein the tubular body defines an interior cavity, the jackscrew assembly disposed within the interior cavity of the tubular body, and the jackscrew assembly includes a screw with a drive connector adapted to engagingly receive the output end of the drive shaft such that rotation of the drive shaft rotates the screw.

9. The in-line jack of claim 2, wherein the motor, the planetary gearbox, the manual crank box, the body, and the extendable shaft are substantially aligned with each other and each has an outer surface confined within a transverse cross-sectional area taken along a plane perpendicular to the longitudinal axis that does not exceed about nine square inches.

10. The in-line jack of claim 1, wherein the jackscrew assembly includes a screw with a drive connector adapted to engagingly receive the drive shaft such that rotation of the drive shaft rotates the screw.

11. The in-line jack of claim 10, wherein the tubular body includes a bearing fixedly disposed within the interior of the body, the screw extending through the bearing, the screw interacting with the bearing such that the screw is rotatable about its longitudinal axis and constrained from translating along its longitudinal axis relative to the bearing.

12. The in-line jack of claim 11, wherein the jackscrew includes a nut mounted to the extendable shaft and threadingly engaged with the screw such that rotation of the screw in a first direction moves the shaft in an extending direction away from the first end of the body and such that rotation of the screw in a second direction moves the shaft in a retracting direction toward the first end of the body.

13. The in-line jack of claim 1, further comprising:
a foot disposed at the distal end of the shaft extending out of the second end of the body.

* * * * *